(12) United States Patent
Kwon et al.

(10) Patent No.: US 12,467,074 B2
(45) Date of Patent: Nov. 11, 2025

(54) METHOD AND APPARATUS FOR CAPTURING HIGH-PURITY NUCLEOTIDES

(71) Applicant: SEOUL NATIONAL UNIVERSITY R&DB FOUNDATION, Seoul (KR)

(72) Inventors: Sung Hoon Kwon, Seoul (KR); Sung Sik Kim, Seoul (KR); Hui Ran Yeom, Cheorwon-gun (KR); Yong Hee Lee, Seoul (KR); Namphil Kim, Hanam-si (KR); Hamin Kim, Seoul (KR); Wonjun Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 93 days.

(21) Appl. No.: 16/611,190

(22) PCT Filed: May 14, 2018

(86) PCT No.: PCT/KR2018/005493
§ 371 (c)(1),
(2) Date: Nov. 5, 2019

(87) PCT Pub. No.: WO2018/208133
PCT Pub. Date: Nov. 15, 2018

(65) Prior Publication Data
US 2020/0165662 A1 May 28, 2020

(30) Foreign Application Priority Data
May 12, 2017 (KR) .................. 10-2017-0059558

(51) Int. Cl.
*C12Q 1/6806* (2018.01)
*C12N 9/12* (2006.01)
(Continued)

(52) U.S. Cl.
CPC ......... *C12Q 1/6806* (2013.01); *C12N 9/1252* (2013.01); *C12Q 1/686* (2013.01);
(Continued)

(58) Field of Classification Search
None
See application file for complete search history.

(56) References Cited

U.S. PATENT DOCUMENTS

2002/0012930 A1* 1/2002 Rothberg ........... G01N 21/7703
435/8
2006/0040297 A1* 2/2006 Leamon ............. G01N 21/6428
435/6.18
(Continued)

FOREIGN PATENT DOCUMENTS

KR 1020130018575 A 2/2013
KR 1020140075611 A 6/2014
(Continued)

OTHER PUBLICATIONS

Kim et al. 'Shotgun DNA synthesis' for the high-throughput construction of large DNA molecules. Nucleic Acids Research 40(18):e140 (8 pages). (Year: 2012).*
(Continued)

*Primary Examiner* — Samuel C Woolwine
(74) *Attorney, Agent, or Firm* — STIP Law Group, LLC

(57) ABSTRACT

The present invention relates to a technique for synthesizing DNA sequences in high purity at low cost. More specifically, the present invention relates to a method and apparatus for capturing high-purity nucleotides that is suitable for use in the field of genome/gene synthesis.

21 Claims, 15 Drawing Sheets
Specification includes a Sequence Listing.

(51) Int. Cl.
*C12Q 1/686* (2018.01)
*C12Q 1/6869* (2018.01)

(52) U.S. Cl.
CPC ...... *C12Q 1/6869* (2013.01); *C12Q 2531/113* (2013.01); *C12Q 2563/185* (2013.01)

(56) References Cited

U.S. PATENT DOCUMENTS

| | | | | |
|---|---|---|---|---|
| 2014/0329712 | A1* | 11/2014 | Edwards | C12Q 1/6806 506/9 |
| 2015/0072873 | A1 | 3/2015 | Heinz et al. | |
| 2015/0322485 | A1* | 11/2015 | Kwon | B01J 19/0046 506/3 |
| 2016/0244825 | A1 | 8/2016 | Vigneault et al. | |

FOREIGN PATENT DOCUMENTS

| | | | | |
|---|---|---|---|---|
| KR | 1020140111224 A | | 9/2014 | |
| WO | WO-2016154302 A1 * | | 9/2016 | C12M 1/40 |

OTHER PUBLICATIONS

Heather et al. The sequence of sequencers: The history of sequencing DNA. Genomics 107(1):1-8. (Year: 2016).*
Nelson et al. BioTechniques 32:S44-47. (Year: 2002).*
Micke, et al. Laser-Assisted Cell Microdissection Using the PALM System. In: Murray, G.I., Curran, S. (eds) Laser Capture Microdissection. Methods in Molecular Biology™, vol. 293. Humana Press. (Year: 2005).*
Davison et al. Lability of Single-stranded Deoxyribonucleic Acid to Hydrodynamic Shear. J. Mol. Biol. 16:490-502 (1966). (Year: 1966).*
Sangwoo Han et al., Synthesis of a multi-functional DNA nanosphere barcode system for direct cell detection, Nanoscale, 2017, pp. 14094-14102, vol. 9, The Royal Society of Chemistry, Cambridge, United Kingdom.
International Search Report of PCT/KR2018/005493, Aug. 23, 2018, English translation.
Cuie Wang et al., DNA microarray fabricated on poly(acrylic acid) brushes-coated porous silicon by in situ rolling circle amplification, Analyst, Jul. 31, 2012, pp. 4539-4545, vol. 137, The Royal Society of Chemistry, London, United Kingdom.

* cited by examiner

[Fig. 8]
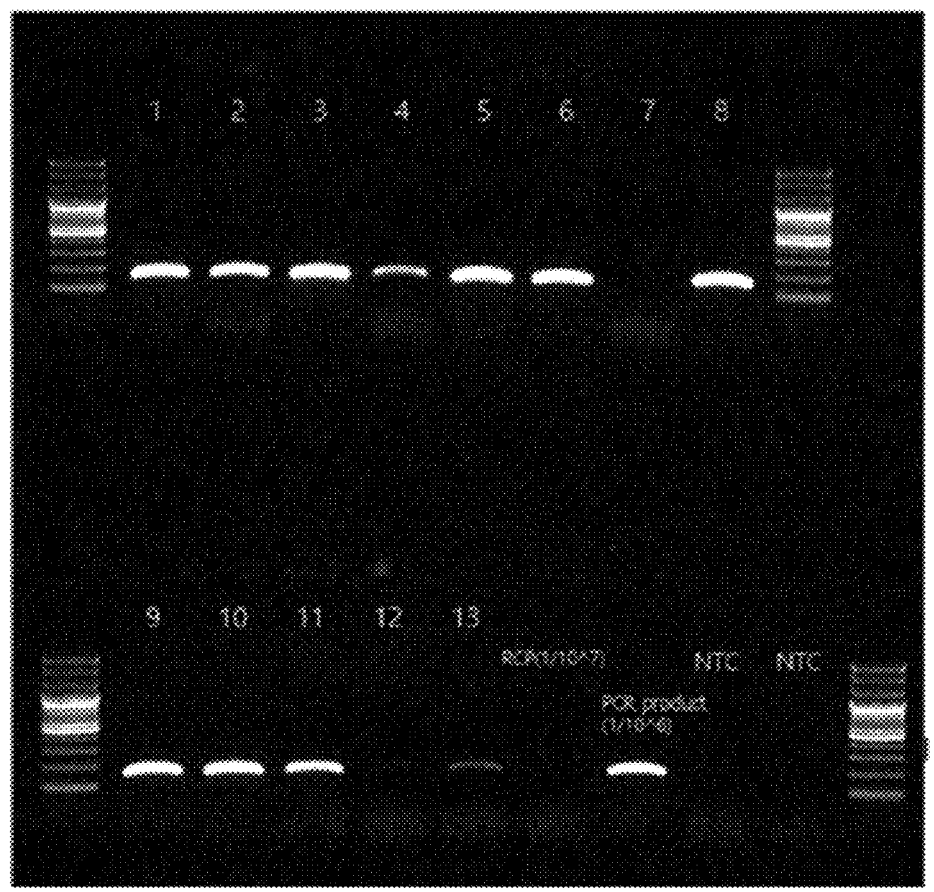
[Fig. 9]
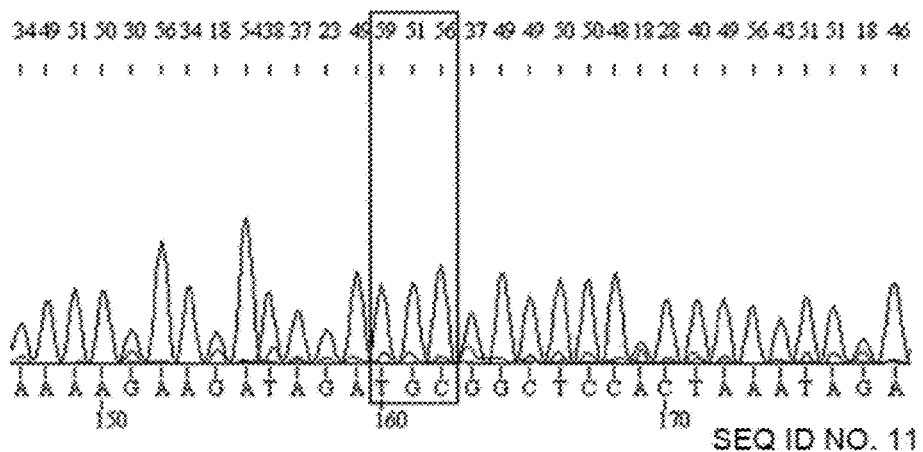

[Fig. 12]
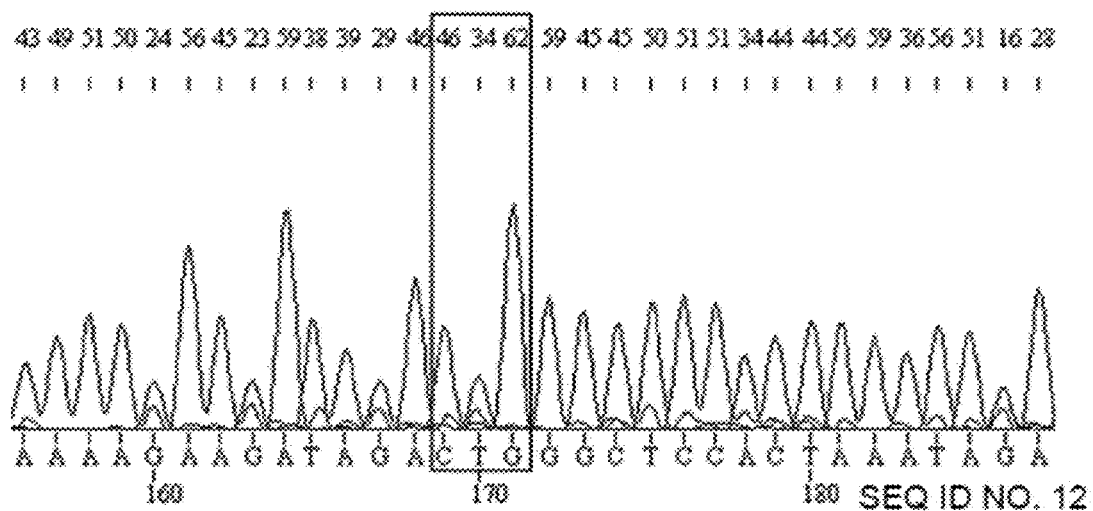
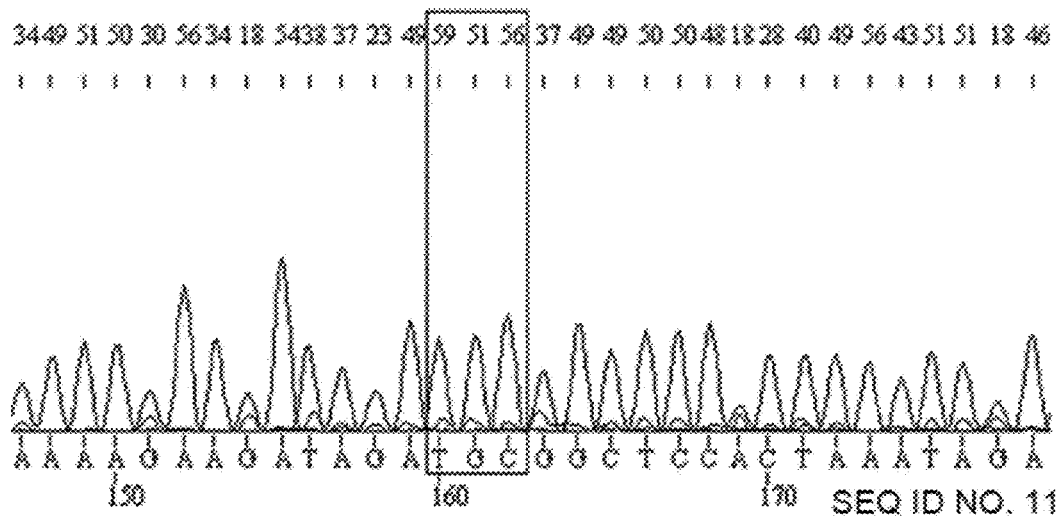
[Fig. 13]
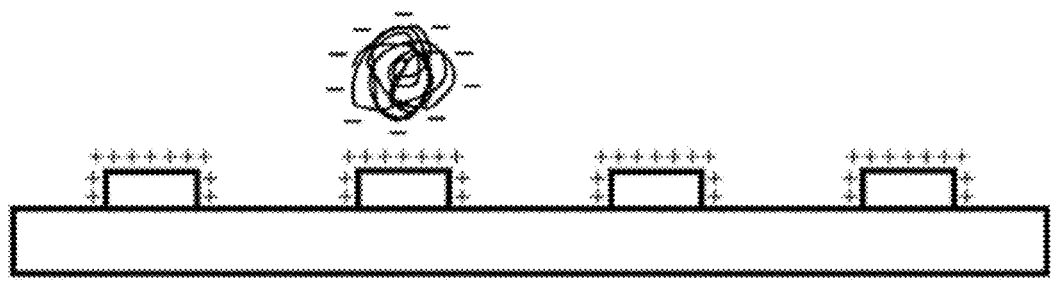

METHOD AND APPARATUS FOR CAPTURING HIGH-PURITY NUCLEOTIDES

CROSS-REFERENCE TO RELATED APPLICATIONS

This application is the U.S. National Phase under 35 U.S.C. § 371 of International Application No. PCT/KR2018/005493 filed on May 14, 2018, which in turn claims the benefit of Korean Application No. 10-2017-0059558, filed on May 12, 2017, the disclosures of which are incorporated by reference into the present application.

SEQUENCE LISTING

A SEQUENCE LISTING is submitted in a file named PUS190077-1-ST25 via Patent Center and is hereby incorporated by reference in its entirety. Said file was created on Nov. 16, 2024 and is 3,491 bytes in size.

TECHNICAL FIELD

The present invention relates to a technique for synthesizing DNA sequences in high purity at low cost, and more specifically to a method and apparatus for capturing high-purity nucleotides that is suitable for use in the field of genome/gene synthesis.

BACKGROUND ART

The development of microarray DNA synthesis technologies allows for simultaneous synthesis of very many types of DNA sequences at low cost. However, the microarray synthesis methods are based on chemical synthesis, limiting the length of DNA sequences with significant errors. Particularly, since the DNA sequences are synthesized as a mixture, only error-free ones need to be separated after individual identification. The separation process involves more cost than the synthesis process, which limits its use. Although next generation sequencing (NGS) capable of parallel sequencing at one time significantly reduces the cost required to verify sequence information, the subsequent DNA purification requires manual separation that still incurs much cost and time.

That is, conventional purification techniques include randomly separating DNA sequences believed to be free of errors and identifying the separated DNA sequences to find error-free ones. However, the random separation is performed manually and is thus very time consuming. Further, the sequences are individually identified by expensive Sanger sequencing. Therefore, there is still a need for a technique for synthesizing DNA sequences with low error rate at ultra-low cost.

On the other hand, although high-throughput DNA sequencing processes can be applied to partially addressable spots (for example, Roche-454 (clonal spots) available from Illumina), it is difficult to isolate target DNA due to the difficulty associated with the collection of the desired DNA from high-throughput sequencing plates. In this connection, it was reported that chip-cleaved oligonucleotides were sequenced by 454 sequencing technology and directly isolated from the 454 sequencing plate using a bead picking pipette, and these sequence-verified oligonucleotides were subsequently processed and used to assemble 200 bp target DNA fragments (Matzas M., et al., 2010). This study demonstrates the possibility of convergence of NGS technology and microchip oligonucleotides in terms of DNA synthesis cost reduction. In this study, however, high-throughput sequencing was carried out on microchip oligonucleotides rather than on assembled DNA fragments.

Accordingly, challenges associated with DNA assembly into larger sequences are still in early stages. A further need exists to increase the accuracy of a technique for sequencing only error-free DNA strands based on barcoding of DNA molecules to analyze the genomes of single cells and synthesize genes.

DETAILED DESCRIPTION OF THE INVENTION

Problems to be Solved by the Invention

Thus, the present invention provides a method and apparatus for capturing nucleic acid molecules by synthesizing sequences in high purity at low cost, identifying only validated ones of the sequences, and purifying the validated sequences with high efficiency at low cost.

Means for Solving the Problems

According to one embodiment of the present invention, there is provided a method for capturing high-purity nucleic acid molecules, including (a) preparing nucleic acid fragments, (b) tagging the nucleic acid fragments with barcode sequences, (c) determining the location coordinates of sequence-validated ones of the nucleic acid fragments tagged with the barcode sequences, and (d) retrieving the sequence-validated fragments based on the location coordinates.

According to a further embodiment of the present invention, there is provided an apparatus for capturing high-purity nucleic acid molecules, including: a stage attached with nucleic acid fragments tagged with different types of barcode sequences in the form of individual spots and mounted with a support on which the individual spots are spaced apart from one another; a parallel sequencer adapted to separate sequence-validated ones of the nucleic acid fragments tagged with the barcode sequences; an imager adapted to observe information on the barcode sequences attached to the sequence-validated fragments separated by the parallel sequencer on the support; and an extractor adapted to apply energy to the location coordinates of the sequence-validated fragments in either a contact or non-contact mode to separate the sequence-validated fragments from the support.

According to another embodiment of the present invention, there is provided a bead-free nucleic acid microsphere produced by the method and having negatively charged single-stranded DNA molecules.

Effects of the Invention

The technique of the present invention is based on the use of a commercially available support and a conventional synthesis method and enables the synthesis of 500 genes at a cost corresponding to the purchase price of one gene, achieving high throughput. In addition, the technique of the present invention is effective in significantly reducing error rate. Furthermore, the technique of the present invention can reduce the number of processing steps, resulting in a about 10-fold reduction in production time and efficient purification of DNA.

BRIEF DESCRIPTION OF THE DRAWINGS

FIG. 8 photographically shows RCA products (RCPs) after laser separation and subsequent PCR amplification, in which #1-13, PCR product ($1/10^6$), and NTC show RCPs, positive control, and negative control, respectively.

FIG. 9 is a graph showing the identification and validation of barcode sequences by polony sequencing in Example 1, in which the square box represents the barcode sequence region.

FIG. 12 shows the results of polony sequencing for a SU-8 pillar bound with one RCA product (RCP) shown in FIG. 13 and barcode sequences of the pillars identified by Sanger sequencing after laser separation.

FIG. 13 is a cross-sectional diagram showing the immobilization of an RCA product (RCP) on a substrate by an electrostatic force in Example 1.

BEST MODE FOR CARRYING OUT THE INVENTION

The present invention will now be described in more detail with reference to the accompanying drawings. Although DNA molecules are exemplified as nucleic acid molecules hereinbelow, targets to be captured and separated are not limited to DNA.

Figure 1:
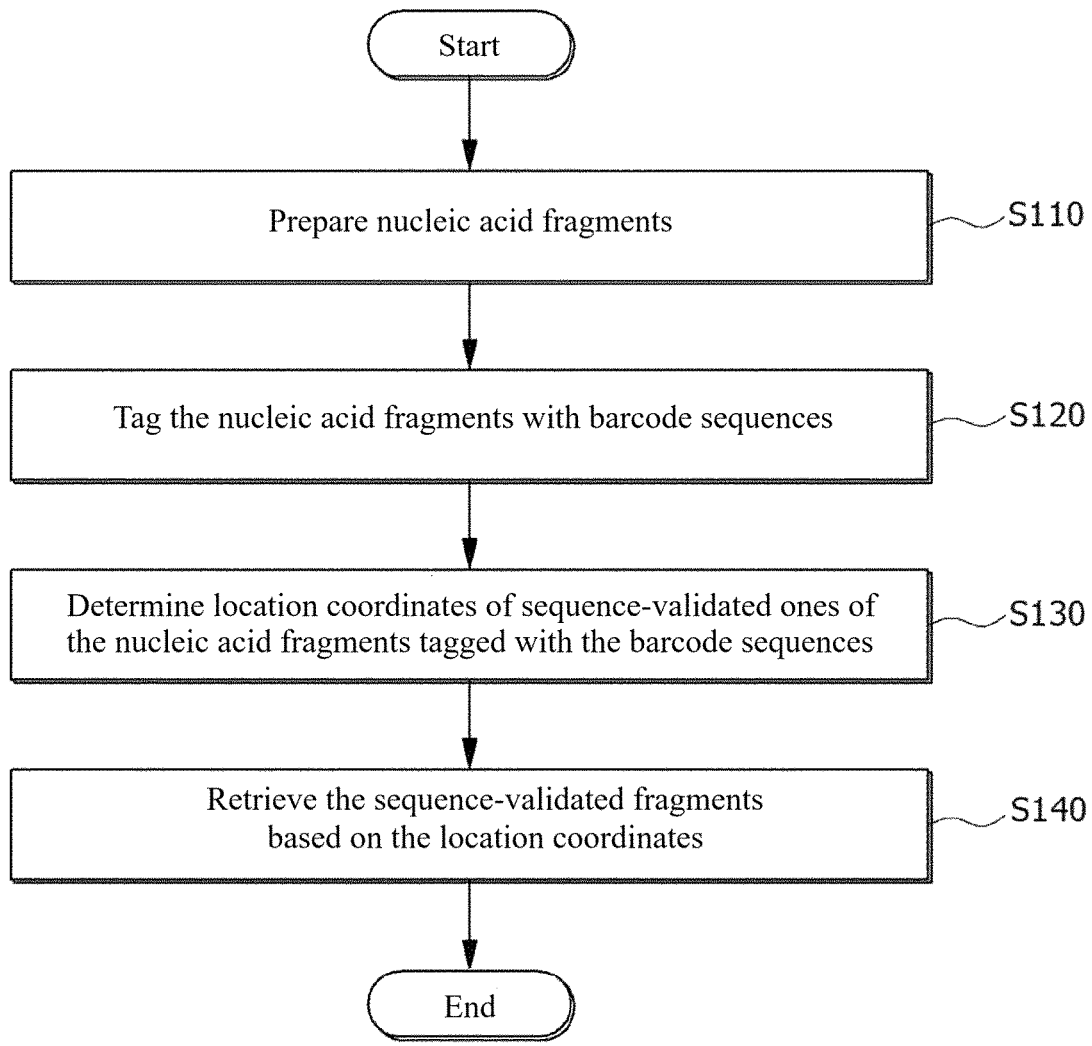
FIG. 1 and FIG. 2 are a schematic flowchart and a detailed diagram illustrating the retrieval of high-purity DNA to synthesize validated sequences in accordance with one embodiment of the present invention, respectively.
Figure 2:
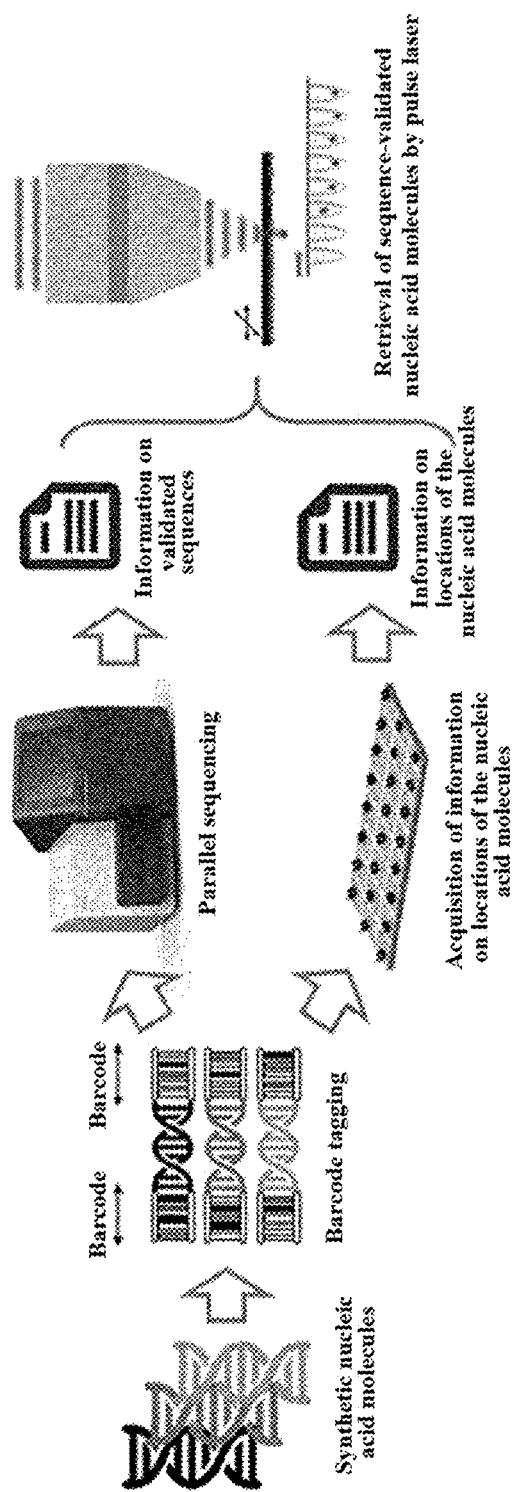

FIGS. 1 and 2 are a schematic flowchart and a detailed diagram illustrating the retrieval of high-purity DNA to synthesize validated sequences in accordance with one embodiment of the present invention, respectively. Referring to FIGS. 1 and 2, nucleic acid fragments are prepared (S110). For example, the nucleic acid fragments may be prepared by fragmenting a nucleic acid sample into sizes sufficient to be identified by parallel sequencing. The nucleic acid fragments are assembled to constitute at least a portion of the complete sequence of a target nucleic acid molecule. The nucleic acid sample may be, for example, deoxyribonucleic acid (DNA), ribonucleic acid (RNA), peptide nucleic acid (PNA), locked nucleic acid (LNA), glycol nucleic acid (GNA), threose nucleic acid (TNA), xeno nucleic acid (XNA), synthetic nucleic acid, modified nucleic acid or a combination thereof. DNA is preferred for its ease of in vitro or in vivo amplification. The DNA may be chemically synthesized on a microarray or derived from an organism.

The target nucleic acid molecules may be nucleic acid molecules isolated from organisms, nucleic acid molecules screened from nucleic acid libraries, nucleic acid molecules obtained by modifying or combining nucleic acid fragments by genetic engineering, chemically synthesized nucleic acid molecules, or combination thereof. The target nucleic acid molecules may be single- or double-stranded.

The target nucleic acid molecules may be produced by microarray-based synthesis. The microarray-based synthesis refers to a technique for simultaneous parallel synthesis of the same, similar or different types of biochemical molecules using synthetic spots immobilized at intervals of several μm to several cm on a solid substrate.

Preferably, the nucleic acid fragments are derived from DNA microchips providing several million types of sequences at low costs or from a pool of synthetic oligonucleotides. The pool of synthetic oligonucleotides may be prepared by methods well known in the art. For example, the pool of synthetic oligonucleotides may be prepared from resin-based oligonucleotides but is not limited thereto. Preferably, the nucleic acid fragments are derived from DNA microchips.

For the utilization of the sequence-validated fragments, the nucleic acid fragments should be free of sequence errors such as insertion, deletion, transition and transversion.

The nucleic acid fragments prepared in step S110 may be directly extracted from a pool of oligonucleotides. Alternatively, the nucleic acid fragments may be prepared by amplifying and assembling oligonucleotides so as to have lengths above a predetermined level.

The nucleic acid fragments may include the complete sequence of a target nucleic acid molecule. For the synthesis of error-free DNA having validated sequences, the nucleic acid fragments may be sequenced using a parallel sequencing system. When the lengths of the nucleic acid fragments whose sequences can be identified using a parallel sequencing system are taken into consideration, the nucleic acid fragments are preferably 20-3,000 bp, more preferably 200-1,000 bp, most preferably 300-500 bp in length. Despite this preferred numerical range, an improvement in the performance of parallel sequencing systems for the analysis of several thousand bp long DNA can extend the size of the nucleic acid fragments to several thousand bp long DNA.

The term "nucleotide" as used herein refers to a single- or double-stranded deoxyribonucleotide or ribonucleotide and includes naturally occurring nucleotide analogs unless stated otherwise.

The term "oligonucleotide" as used herein refers to an oligomer or polymer of nucleotides or an analog thereof. According to one embodiment of the present invention, the gene amplification of the present invention is carried out by PCR. According to one embodiment of the present invention, primers are used in gene amplification reactions.

The term "amplification reactions" as used herein refers to reactions for amplifying target nucleic acid sequences. Various amplification reactions were reported in the art and include, but are not limited to, polymerase chain reaction (PCR), reverse transcription polymerase chain reaction (RT-PCR), rolling circle amplification (RCA), loop-mediated isothermal amplification (LAMP), sequence replication (SR), strand displacement amplification (SDA), ligase chain reaction (LCR), nucleic acid sequence based amplification (NASBA), and multiple displacement amplification (MDA).

Unless otherwise defined, the term "parallel sequencing" as used herein is intended to include massively parallel sequencing, Sanger sequencing, mass spectrometry, electrophoresis, hybridization, digital PCR, allele-specific PCR, quantitative PCR, fluorescence-based classification, or combinations thereof.

The massively parallel sequencing may be selected from the group consisting of sequencing by synthesis, Ion Torrent sequencing, pyrosequencing, sequencing by ligation, nanopore sequencing, single-molecular real-time sequencing, and combinations thereof. For example, the massively parallel sequencing may be next generation sequencing (NGS).

In one embodiment of the present invention, the amplification may be performed by PCR, the most well-known amplification method.

Primers used in the present invention are hybridized or annealed to sites of a template to form double-stranded structures. Suitable conditions of nucleic acid hybridization for the formation of such double stranded structures are described in Joseph Sambrook, et al., Molecular Cloning, A Laboratory Manual, Cold Spring Harbor Laboratory Press, Cold Spring Harbor, N.Y. (2001) Haymes, B. D., et al., Nucleic Acid Hybridization, A Practical Approach, IRL Press, Washington, D.C. (1985).

A variety of DNA polymerases can be used for amplification in the present invention. Such DNA polymerases include "Klenow" fragment of *E. coli* DNA polymerase I, thermostable DNA polymerases, and bacteriophage T7 DNA polymerase. Preferred are thermostable DNA polymerases that can be obtained from a variety of bacterial species, including DNA polymerases and Phusion polymerases of *Thermus aquaticus* (Taq), *Thermus thermophilus* (Tth), *Thermus filiformis, Thermis flavus, Thermococcus literalis, Pyrococcus furiosus* (Pfu), *Thermus antranikianii, Thermus caldophilus, Thermus chliarophilus, Thermus flavus, Thermus igniterrae, Thermus lacteus, Thermus oshimai, Thermus ruber, Thermus rubens, Thermus scotoductus, Thermus silvanus, Thermus* species Z05, *Thermus* species sps 17, *Thermus thermophilus, Thermotoga maritima, Thermotoga neapolitana*, and *Thermosipho africanus*. Most preferably, *Pyrococcus furiosus* (Pfu) or Phusion high-fidelity DNA polymerase is used.

When the polymerization reaction is carried out, it is preferred to provide excessive amounts of components necessary for amplification to a reactor. The excessive amounts of components necessary for amplification refer to amounts of the components in which the amplification reaction is not substantially limited by the concentrations of the components. It is desirable to provide, to the reaction mixture, cofactors such as $Mg^{2+}$ and dATP, dCTP, dGTP and dTTP in amounts sufficient to reach a desired degree of amplification.

All enzymes used in the amplification reaction may be active under the same reaction conditions. Indeed, a buffer allows all enzymes to reach their optimum reaction conditions. Thus, the use of a buffer enables the amplification of a single reactant without any change in reaction conditions such as the addition of other reactants.

In the present invention, annealing is carried out under stringent conditions that allow for specific binding between the target nucleotide sequences and primers. The stringent annealing conditions are sequence-dependent and vary depending on ambient environmental parameters. The oligonucleotide pool thus amplified can be used to make primary amplification products. The primary amplification products can be used to prepare secondary amplification products, which can be assembled into larger target nucleic acid molecules (e.g., ≥10 kb).

The term "primer" as used herein refers to an oligonucleotide that can act as a point of initiation of synthesis when placed under conditions in which synthesis of a primer extension product complementary to a nucleic acid strand (a template) is induced, i.e., in the presence of nucleotides and a polymerase, such as DNA polymerase, and under appropriate temperature and pH conditions. The primers are preferably deoxyribonucleotides and single-stranded. The primers used in the present invention may include naturally occurring dNMP (i.e., dAMP, dGMP, dCMP and dTMP), modified nucleotides, or non-naturally occurring nucleotides. Other examples of the primers include ribonucleotides.

The primers should be sufficiently long to prime the synthesis of extension products in the presence of a polymerase (such as DNA polymerase). The length of the primers may vary depending on many factors, e.g., temperature, application, and sources of the primers. The primers are typically 15-30 nucleotides long. Short primer molecules generally necessitate a lower temperature to form sufficiently stable hybridization composites with templates. The sets of primers for amplifying the target nucleic acid molecules may bind to the terminal sequences of the target nucleic acid molecules.

The term "annealing" or "priming" as used herein refers to the apposition of an oligodeoxynucleotide or nucleic acid to a template nucleic acid. The apposition enables the polymerase to polymerize nucleotides into a nucleic acid molecule complementary to the template nucleic acid or a portion thereof. The term "hybridization" as used herein refers to a process in which two single-stranded nucleic acids form a duplex structure by pairing of complementary base sequences. The hybridization may occur when complementarity between single-stranded nucleic acid sequences is perfectly matched or even when partially mismatching bases are present. The degree of complementarity necessary for hybridization may vary depending on hybridization reaction conditions, particularly temperature.

The term "complementary" as used herein means a level of complementarity sufficient to selectively hybridize with the nucleotide sequence under certain particular hybridization or annealing conditions and is intended to include both substantially complementary and perfectly complementary, preferably perfectly complementary.

Referring back to FIG. 1, in step S120, the nucleic acid fragments are tagged with barcode sequences. The barcode sequences are introduced into the nucleic acid fragments to retrieve validated fragments or other desired fragments among the nucleic acid fragments provided in the previous step or to selectively amplify and assemble them in order to synthesize target nucleic acid molecules. In subsequent step S130, the complete sequence is identified by parallel sequencing. The use of information on the barcodes having validated sequences for the separation of the corresponding barcode regions on a support is preferable in that the sequences can be identified and the error-free target nucleic acid molecules can be separated in a simple and effective manner.

The types of the barcode sequences are not particularly limited so long as they can be added to distinguish the nucleic acid fragments from each other. Preferably, the number of the types of the barcode sequences to distinguish the individual nucleic acid fragments is equal to or greater than that of the nucleic acid fragments. For example, the barcode sequences may be mixtures of two or more types of randomly or intentionally designed oligonucleotides. The barcode sequences may be 5 to 300 bp in length.

According to one embodiment of the present invention, the nucleic acid fragments may be tagged with barcode sequences by a nucleic acid amplification method including preparing primers including both fixed nucleic acid sequences and nucleic acid sequences capable of tagging the target nucleic acid molecules, mixing the primers with the target nucleic acid molecules to prepare a reaction solution, and obtaining the target nucleic acid molecules from the reaction solution.

Some or all of the primers may be either DNA or RNA.

The tagging nucleic acid sequences may be 4 nt to 35 nt in length. The primers may include two or more tagging nucleic acid sequences. The nucleic acid sequences capable of tagging the target nucleic acid molecules may be 4 nt to 10 nt in length. The nucleic acid sequences capable of tagging the target nucleic acid molecules may be random sequences.

The tagging with the barcode sequences is not particularly limited and may be performed by a method selected from the group consisting of PCR, emulsion PCR, ligation, and combinations thereof. Specifically, the barcode sequences may be tagged by selectively amplifying the target fragments with the primers corresponding to the barcode sequences and retrieving the amplification products.

Referring back to FIGS. 1 and 2, in step S130, the location coordinates of sequence-validated ones of the nucleic acid fragments tagged with the barcode sequences are determined. Parallel sequencing is preferably used to identify sequences of the tagged nucleic acid fragments. As a result, the sequences of the tagged nucleic acid fragments together with the tagging barcode sequences can be identified.

According to one embodiment of the present invention, the parallel sequencing or high-throughput sequencing is carried out by a suitable method well known in the art, for example, using an Illumina sequencing system or a high-throughput sequencing system with a read length of 100 bp or more (see step S130 of FIG. 1 and FIG. 2). As a result of the sequencing, error-free validated DNA can be captured and barcode sequence information can be acquired.

Sequences containing the barcode sequences added to the nucleic acid fragments are herein referred to as "barcode primers". The term "adaptor sequences" as used herein refers to sequences that enable high-throughput sequencing analysis of the nucleic acid fragments. For example, the adaptor sequences include all commercially available sequences for Illumina sequencing used in the present invention. Examples of preferred adaptor sequences include, but are not limited to, adaptor sequences of Illumina sequencing platforms and adaptor sequences of other kinds of next-generation sequencing technologies.

According to one embodiment of the present invention, an amplification procedure using the primers bound to the adaptor sequences may be performed using the tagged nucleic acid fragments as templates for sequence identification. The barcode sequences are not limited to particular lengths and are, for example, 5-300 bp, preferably 10-100 bp, more preferably 12-40 bp in length taking into consideration the sequencing performance on the complete sequence including the nucleic acid fragments. This numerical range may vary depending on the type of the sequencing system used.

Some or all of the primers may be either DNA or RNA.

The primers may be bound with molecules that can be selectively captured. Such molecules may be selected from the group consisting of biotin, biotin dT, biotin-TEG, Dual biotin, PC-biotin, acrylic group, thiol group, dithiol group, amine group, NHS ester, azide, hexynyl, octadiynyl dU, his tag, protein tag, polyadenine (polyA), some sequencing adapters for NGS, and fixed DNA sequences of 10 nt or more.

The method may further include selectively capturing only desired nucleic acid molecules from the primers by a suitable capture process adapted to the molecules capable of being captured. The capture process may be carried out using a material selected from the group consisting of avidin, neutravidin, streptavidin, carboxylic group, thiol, alkyne, digoxigenin, azide, and hexynyl or may be polymerase chain reaction (PCR).

The method may further include immobilizing nucleic acids amplified with the target nucleic acid molecules on a support before the capture. The method may further include immobilizing nucleic acids amplified with the target nucleic acid molecules on a support after the capture. The method may further include fragmenting nucleic acids amplified with the target nucleic acid molecules before the capture. The method may further include fragmenting nucleic acids amplified with the target nucleic acid molecules after the capture. The selectively captured molecules may be double-stranded DNA (dsDNA) or single-stranded DNA (ssDNA). The molecules are rich in ssDNA, which is preferable in terms of reaction process. The primers may be bound with a material that impedes access of proteins due to steric hindrance.

In the case where the method includes directly immobilizing nucleic acids amplified with the target nucleic acid molecules on a support, the capture step may be omitted. RCA products (RCPs) can be formed by hybridization of the selectively captured molecules or the molecules directly immobilized before the capture with probes, circularizing the hybridization products by ligation, followed by amplification with a DNA polymerase. The DNA polymerase may be, for example, Bst DNA polymerase, Exonuclease Minus, Tth DNA polymerase, PyroPhage TM 3173 DNA polymerase, BcaBEST DNA polymerase or Phi29 DNA polymerase. Phi29 DNA polymerase having an error probability of $10^{-8}$ per sequence is particularly preferred in terms of RCA reaction efficiency. For example, the DNA polymerase may be present in such an amount that 1 nmole of dNTP is polymerized per minute at 30° C.

The RCA products (RCPs) are immobilized on a support, which is preferable in that desired ones of the RCA products (RCPs) can be separated at the corresponding locations in high purity after information on the barcode sequences is verified. The RCA products (RCPs) have a diameter of 5 μm or less and the fragments tagged with the sequences obtained by immobilization of the RCA products (RCPs) on the support are in the form of molecular clones with a diameter of 30 µm or less. Accordingly, the support can utilize its entire surface area more sufficiently than conventional supports, including not only microwell supports but also specially shaped supports, achieving markedly improved throughput of the molecular clones.

The sequencing enables identification of the validated ones of the nucleic acid fragments and the barcode sequences tagging the validated nucleic acid fragments. In the present invention, a support immobilized with the nucleic acid fragments having the identified barcode sequences is prepared such that the fragments having the identified barcode sequences are easily separated, and the validated nucleic acid fragments can be rapidly separated based on the location coordinates representing the corresponding barcode sequences on the support.

For example, referring back to FIGS. 1 and 2, the step of parallel sequencing all or some of the sequences of the fragments tagged with the barcode sequences in step S120 to identify the barcode sequences of the sequence-validated fragments and the step of preparing a support immobilized with the fragments having the identified barcode sequences as the sequence-validated fragments and performing sequencing to determine the location coordinates representing the corresponding barcode sequences on the support may be carried out either simultaneously or sequentially (see step S130 of FIG. 1 and FIG. 2).

For example, the sequencing step may include i) immobilizing the fragment tagged with the barcode sequences in step S120 on a support and ii) identifying the barcode sequences of the tagged fragments immobilized on the support to determine the location coordinates representing the barcode sequences identified by the sequence-validated fragments in the parallel sequencing step (see FIGS. 1 and 2).

Specifically, in substep i), the fragments tagged with the barcode sequences are amplified by rolling circle amplification (RCA), loop-mediated isothermal amplification (LAMP), sequence replication (SR), strand displacement amplification (SDA), ligase chain reaction (LCR), nucleic acid sequence based amplification (NASBA) or multiple displacement amplification (MDA) and are then immobilized on a support by interaction with the support surface. The RCA or MDA may be carried out using a DNA polymerase such as phi29 polymerase. The use of the DNA polymerase enables the synthesis of high-purity DNA due to its low error rate ($10^{-8}$ per sequence).

For example, the surface layer of the support immobilized with the fragments tagged with the barcode sequences, the amplification products or combinations thereof may have a flat, well or pillar structure, a structure patterned with repeated shapes or grids, or a combined structure thereof.

The structure of the support surface layer may be modified such that one DNA cluster is present in one pattern. For example, the structural modification may be accomplished by adjusting the height and width of fine particles and the intervals between the fine particles to low levels. The support surface layer may be patterned by lithography. The patterned structure of the support surface layer may be formed by photopolymerization. The structure of the support surface layer may be patterned to sizes as small as 100 µm to 5 µm based on the phenomenon of light diffraction or interference.

For example, the support surface immobilized with the fragments tagged with the barcode sequences, the amplification products or combinations thereof may be composed of a polymer, silica, hydrogel, glass or a combination thereof.

The interaction with the support surface to immobilize the fragments tagged with the barcode sequences on the support may be, for example, electrostatic attraction, adsorption, protein binding, self-assembly, bonding of chemical functional groups or a combination thereof.

The fragments tagged with the barcode sequences, the amplification products or combinations thereof may be immobilized on the surface or inside of a substrate, on the surface or inside of cells, on the surface or inside of a patterned substrate, or at locations including combinations thereof. Particularly, the support or the substrate is preferably a flat plate or has an inverted nano/microwell structure in terms of its ease of immobilization.

The fragments tagged with the barcode sequences, the amplification products or combinations thereof may be immobilized on the support by immobilizing probes having sequences complementary to the target nucleic acid molecules of the fragments tagged with the barcode sequences on the support, capturing the fragments tagged with the barcode sequences on the probes, and amplifying the tagged fragments by rolling circle amplification (RCA), loop-mediated isothermal amplification (LAMP), sequence replication (SR), strand displacement amplification (SDA), ligase chain reaction (LCR), nucleic acid sequence based amplification (NASBA) or multiple displacement amplification (MDA). Here, the RCA or MDA may be carried out using a DNA polymerase such as phi29 polymerase. The use of the DNA polymerase enables the synthesis of high-purity DNA due to its low error rate ($10^{-8}$ per sequence).

For example, the location coordinates may be determined by labeling the barcodes with fluorescent molecules and directly observing the fluorescence. The fluorescent molecules may be molecules of at least one fluorescent material selected from the group consisting of fluorescein isothiocyanate, 5,6-carboxymethyl fluorescein, Texas red, nitrobenz-2-oxa-1,3-diazol-4-yl, coumarin, dansyl chloride, rhodamine, aminomethyl coumarin, eosin, erythrosin, BODIPY®, Cascade Blue®, Oregon Green®, pyrene, lissamine, xanthene, acridine, oxazine, phycoerythrin, Cy3, Cy3.5, Cy5, Cy5.5, and Cy7. The barcode sequences may be modified to tag the fluorescent molecules. This enables the quantification of barcoded ones of the amplification products.

Specifically, the barcode sequencing can be performed by sequencing by synthesis (SBS), sequencing by ligation (SBL), ELISA or a combination thereof.

In the step of determining the location coordinates, the desired nucleic acid fragments whose sequences are identified by sequencing are selectively amplified with primers corresponding to the barcode sequences whose sequences are also identified by sequencing, retrieved, and immobilized on a support. Thereafter, the desired nucleic acid fragments are rapidly retrieved using the identified barcode sequences based on the location coordinates on the support or a combination thereof. For example, the validated nucleic acid fragments may be error-free nucleic acid fragments.

A computer program may be used to provide images for rapid retrieval. Specifically, a computer program provides images to virtually assembly the sequences of the nucleic acid fragments and compares the assembled sequence with the complete sequence of the desired target nucleic acid molecules. Thereafter, based on barcode sequences of the most optimized DNA fragments, the corresponding optimized nucleic acid fragments may be efficiently retrieved on a support separately prepared (see step S140 of FIG. 1 and FIG. 2).

Specifically, the locations of the nucleic acid molecules having desired sequences on the support can be determined by matching the complete sequence to the barcode sequences. Based on the determined locations of the desired nucleic acid molecules on the support, the corresponding nucleic acid molecules can be separated by extraction or non-extraction. For example, the use of a laser is more preferred for separation of the corresponding nucleic acid molecules without damage and is more advantageous for automation.

The retrieval based on the location coordinates is performed by applying energy in either a contact or non-contact manner with the application of ultrasonic waves, a pneumatic pressure, a laser or a combination thereof, which is preferable in terms of purification efficiency, but is not limited thereto.

Specifically, the nucleic acid molecules having desired sequences are separated by applying a laser to all regions of the nucleic acid molecules having desired sequences, including the peripheral portions of the regions. Alternatively, the nucleic acid molecules having desired sequences may be separated by removing partial functional groups with a chemical or using an electric force or heat. The application of energy in a non-contact mode may be performed by at least one mode selected from the group consisting of ultrasonic wave application, pneumatic pressure application, and laser application. For example, the application of energy in a non-contact mode is based on pulse laser ablation by an incident pulse laser or radiation pressure ejection.

The pulse laser may have a wavelength of 10 to 10,000 nm, preferably 20 to 5,000 nm, more preferably 100 to 2,000 nm. An electromagnetic field in the wavelength range defined above, including the visible or infrared range, has no significant influence on optical elements and can transfer sufficient energy to the substrate or the nucleic acid molecules having desired barcode sequences. Since most commercial pulse lasers operate in the wavelength range described above, the system is easy to implement. Also when the substrate uses a sacrificial layer, the technique disclosed in the present invention can be carried out without any substantial change of the system.

The pulse laser may have a pulse duration in the range of 1 as to 1 ms, preferably 1 fs to 100 ns. When pulse laser ablation is performed by the pulse laser having a pulse duration in the range defined above, the propagation paths of the separated substrate and the nucleic acid molecules having barcode sequences are made more constant, making it easy to retrieve the nucleic acid molecules. The pulse laser has a power of 10 to 1 kJ/cm$^2$ per pulse, preferably 100 to 300 J/cm$^2$ per pulse. When pulse laser ablation is performed by the pulse laser having a pulse duration and a pulse power in the ranges defined above, the nucleic acid molecules having desired barcode sequences are less damaged, bringing about high efficiency during subsequent processing of the separated nucleic acids.

The separation of the nucleic acid molecules having desired barcode sequences from the substrate includes transferring the nucleic acid molecules having desired barcode sequences to a reservoir. The transfer to the reservoir is necessary to store the separated nucleic acid molecules and use the nucleic acid molecules upon reaction with other reactants. The reservoir may include a container designed to cause or observe physical or chemical reactions. The reservoir may include an usual container designed to store the biochemical molecules. The reservoir may be an array of microwells, each of which has a volume of 1 pL to 1 µL.

The extraction tool for extraction of the nucleic acid molecules may be combined with a device for moving the tool. The device may be electrically driven. The device is preferably manipulated with a precision of 1 mm or less, more preferably 100 µm or less, even more preferably 5 µm or less, which enables accurate separation of the nucleic acid molecules.

A further embodiment of the present invention provides a method for capturing high-purity nucleic acid molecules, including: amplifying a target nucleic acid molecule by PCR to prepare at least two target nucleic acid molecules having barcode sequences; and randomly separating the at least two cloned nucleic acid molecules attached with barcodes, subjecting the separated cloned nucleic acid molecules to sequencing twice or more, and performing barcode-sequencing information matching, wherein the two or more sequencing steps include forming clusters of the nucleic acid molecules including rolling circulation amplification products (RCPs) with the clonal DNA attached with barcode molecules, immobilizing the clusters of the nucleic acid molecules on a support, and sequencing the barcode regions in the clusters of the nucleic acid molecules.

Specifically, according to the method of the present invention, high-purity nucleic acid molecules are captured by randomly separating two or more types of target nucleic acid molecules having different barcoding nucleic acid sequences, immobilizing the corresponding separated target nucleic acid molecules on a support, sequencing the barcoding regions for RCA products (RCPs), analyzing the other separated target nucleic acid molecules simultaneously or sequentially by next generation sequencing to acquire information on the complete sequence, and performing sequence information matching to provide information on the location of desired sequences on the support.

The target nucleic acid molecules are immobilized on the support by immobilizing RCPs (RCA products) on patterned fine particles on the support, for example, by coating a multi-branched silane compound such as 3-aminopropyltriethoxysilane (APTES) on the support to attach the amine groups to the support surface or attaching hydroxyl, epoxy or acrylic groups onto a substrate in the same manner, performing RCA reactions in a solution to form RCA products (RCPs), and loading the RCA products (RCPs) on the support. Alternatively, the target nucleic acid molecules may be immobilized on the support by subjecting the barcoded DNA molecules to RCA reactions to form RCP (RCA products) and spraying the RCPs on the support.

Particularly, when RCA products (RCPs) are immobilized by performing RCA reactions on the support in step S130, the corresponding optimized nucleic acid fragments may form clusters of the nucleic acid molecules on the support. The clusters of the nucleic acid molecules are clones of the nucleic acid molecules having barcode sequence information and include polonies and the RCA products (RCPs). Here, the clusters of the nucleic acid molecules may be replaced by suitable products of the nucleic acid molecules that can be sequenced.

Figure 5A:
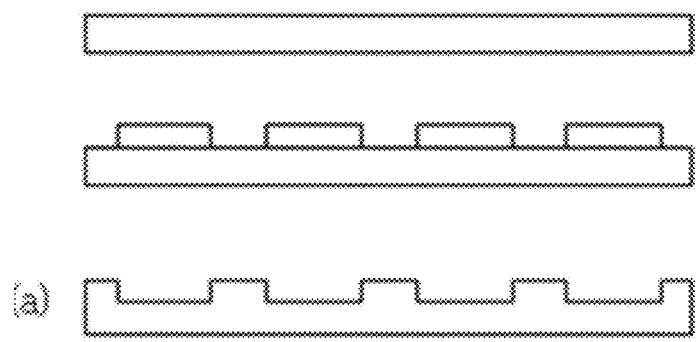
FIG. 5(a) illustrates side and FIG. 5(b) top views of a chip structure used in reactions in accordance with one embodiment of the present invention.
Figure 5B:
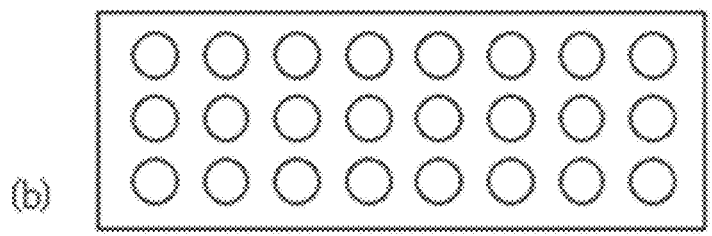

The clusters of the nucleic acid molecules may be immobilized on the nucleic acid molecules packed on the support. Alternatively, the clusters of the nucleic acid molecules may be directly immobilized on the support. In this connection, FIG. 6 schematically illustrates (a) a state in which the target nucleic acid molecules are captured on the substrate and the clones of the target nucleic acid molecules are immobilized thereon after amplification and (b) a state in which the clones of the target nucleic acid molecules as amplification products are immobilized on the support. The substrate may be a patterned substrate illustrated in FIG. 5. FIG. 5 illustrates (a) side and (b) top views of a chip structure used in the reactions in accordance with one embodiment of the present invention. The patterning can be performed such that RCA products (RCPs) corresponding to the clusters of the nucleic acid molecules are packed (not illustrated) on a transparent substrate (e.g., glass) optionally including a sacrificial layer and a polymer layer. The RCA products (RCPs) may be packed in the form of grids, if needed. There is no restriction on the method for packing the RCA products (RCPs). For example, the RCA products (RCPs) may be packed by lithography or self-assembly or the like. Other interactions, for example, protein binding, bonding of chemical functional groups, electrostatic attraction, and adsorption, may be used for the packing of the RCA products (RCPs). An array may be formed by direct immobilization rather than packing.

The support may require pillars as means artificially supporting the formation of a regular array of RCA products (RCPs) thereon. The support may be an epoxy-based negative photoresist, for example, a SU-8 photoresist. The pillars impart regularity to a desired array and may be arranged at intervals of 1 μm to 5 mm, preferably 100 nm to 1 mm, more preferably 1 μm to 500 μm.

FIG. 6 cross-sectionally illustrates (upper) a state in which DNA molecules are captured on the substrate and RCA products are immobilized thereon and (lower) a state in which RCA amplification products are immobilized according to exemplary embodiments of the present invention. Each of the RCA products (RCPs) may include only one cluster of the nucleic acid molecules on the patterned substrate. The number of the RCA products (RCPs) immobilized on the substrate can be freely adjusted by varying their width and interval. Referring to the upper and lower views of FIG. 6, the DNA clusters immobilized on the support are rolled along the shape of the RCA products (RCPs) such that both terminal barcodes are connected to each other or one or more barcodes are connected to each other. As a result, the DNA clusters can be densely packed at small intervals on the support. This arrangement is particularly preferred in throughput improvement.

Next, only error-free fragments capable of optimizing the synthesis of target DNA are retrieved among the nucleic acid fragments (i.e. mixtures of erroneous fragments and error-free fragments) by amplification (PCR) or hybridization using the synthesized barcode oligos. Examples of methods for the retrieval of error-free fragments using the synthesized barcode sequences include, but are not limited to, hybridization methods for retrieving desired error-free fragments by attaching desired barcode sequences to biotinylated beads or magnetic beads, in addition to PCR. If needed, nucleic acid molecules having desired sequences may be further captured from the sequence-validated fragments retrieved in step (d) by any suitable method known in the art, such as amplification or cleavage of specific sequences.

According to another embodiment of the present invention, the barcoded nucleic acid fragments validated to be error-free may be at least 200 bp in length. When a next-generation sequencing system capable of analyzing DNA with 1,000 bp or more is used, the error-free barcoded nucleic acid fragments may be at least 1,000 bp in length. More preferably, the error-free barcoded nucleic acid fragments are from about 200 bp to about 10 kb or more in length.

Another embodiment of the present invention provides an apparatus for capturing high-purity nucleic acid molecules, including: a stage attached with nucleic acid fragments tagged with different types of barcode sequences in the form of individual spots and mounted with a support on which the individual spots are spaced apart from one another; a parallel sequencer adapted to separate sequence-validated ones of the nucleic acid fragments tagged with the barcode sequences; an imager adapted to observe information on the barcode sequences attached to the sequence-validated fragments separated by the parallel sequencer on the support; and an extractor adapted to apply energy to the location coordinates of the sequence-validated fragments in either a contact or non-contact mode to separate the sequence-validated fragments from the support. For example, the extractor may include a pulse laser source and a condenser. The condenser may be an optical lens, a light source or an image sensor. The condenser can be used to focus pulse laser energy and to observe nucleic acid molecules and a substrate. The pulse laser can be accurately irradiated onto the locations of the nucleic acid molecules to be separated on the substrate based on the predetermined xy location coordinates at desired points of time, which is usually performed by controlling the pulse laser in an automated fashion using a control unit such as a computer. The optical lens may have a magnification ranging from 2× to 100×, preferably from 10× to 40×. Within this range, energy suitable for separating the nucleic acid molecules can be transmitted to the substrate and the lens can be prevented from coming into contact with the substrate or detracting from the focal distance. The light source may have a wavelength in the range of 10 nm to 10,000 nm, preferably 50 nm to 2,000 nm. Within this range, the substrate can be easily observed or monitored using fluorescence or visible light. The light source may be, for example, a halogen lamp. The image sensor is usually a charge-coupled device (CCD) but is not limited thereto.

According to one embodiment, the apparatus may further include another stage on which the reservoir for retrieving the desired molecular clones is mounted. The stage may be manipulated with a precision of 1 mm or less, preferably 100 μm or less. The additional stage on which the reservoir is mounted can facilitate the utilization of the separated biochemical molecules.

The extractor is broadly divided into an upper system and a lower system. The upper system is controlled by a computer and consists of an upper stage under which the substrate is attached (Motorized XY stage), an energy application device, and an upper imaging device. That is, a pulse laser beam is focused and enters the substrate through the condenser, and the nucleic acid molecules on the substrate are extracted and pushed to an underlying PCR plate as a reservoir through expansion pressure by pulse laser ablation or radiation pressure. The lower system includes a lower stage moveable in the Z-axis direction (Motorized XYZ stage), a PCR tube rack or PCR plate as a reservoir attached on the lower stage, and a lower imaging device. In the lower imaging device, a reservoir through which image can pass may be used for optical observation when the molecular clones separated from the substrate are collected. For example, the reservoir may have a flat bottom that does not substantially affect the path of light from the light source of the lower imaging device, enabling easy imaging.

The apparatus of the present invention may further include a controller adapted to locate a specific area of the support at a position corresponding to the extractor in order to separate the sequence-validated fragments. For example, the imager may include one or more elements or materials selected from the group consisting of optical lenses, light sources having a wavelength of 10-10,000 nm, image sensors, and fluorescence materials. Specifically, the apparatus of the present invention may be used in combination with the units illustrated in the accompanying drawings and the units described above.

Another embodiment of the present invention provides a bead-free nucleic acid microsphere produced by the method described above and having negatively charged single-stranded DNA molecules. The single-stranded DNA molecules may have a length of about 50 kbp to about 100 Gbp but are not limited thereto.

The long single-stranded nucleic acid molecules form a 3-dimensional structure in which the nucleic acid molecules get entangled or the single strands of repeat sequences are connected to each other. The 3-dimensional structure may have a diameter of 1 nm to 30 µm. For reference, the diameter of the 3-dimensional structure refers to the longest diameter thereof unless otherwise mentioned.

Unlike in general microspheres attached to beads (see the left of FIG. 17), the bead-free nucleic acid microsphere of the present invention can be directly immobilized on the support without the need to separately immobilize the nucleic acid molecules on the support (see the right of FIG. 17), enabling simple immobilization of the nucleic acid molecules. Another advantage of the microspheres according to the present invention is that bead packing does not need to be considered, simplifying the design and production of the support.

The high-purity bead-free nucleic acid microsphere of the present invention has a structure in which the single-stranded nucleic acid molecules get entangled and are negatively charged as a whole, enabling subsequent immobilization of the nucleic acid molecules on the support based on electrostatic binding and adsorption. The high-purity bead-free nucleic acid microsphere of the present invention may consist of repeat sequences, which can thus be captured with probes having sequences complementary to the repeat sequences.

MODE FOR CARRYING OUT THE INVENTION

The present invention will be explained with reference to the following examples. These examples are provided for illustrative purposes and are not intended to limit the scope of the present invention.

Example 1

Step 1: Preparation of Nucleic Acid Fragments Whose Size can be Determined by Parallel Sequencing In the preparation of target DNA molecules, 147 bp-long DNA clones were chemically synthesized using microarrays. Some of the synthetic DNA sequences were as follows:
DNA template A (SEQ ID NO. 1):
TGCCTTGGCAGTCTCAaGATCAgctatcGTTGAACGCACTCACAGCGAcgtctcATG
AGCAAGGGCGAGGAGCTGTTCACCGGGGTGGTGCC-
CATCCTGGTCGAGCTGGACGG
CGACgaagagcACACTGCGGCTCCTCATCCACG
DNA template B (SEQ ID NO. 2):
TGCCTTGGCAGTCTCAaGATCAgctcttcGGCGAG-
GAGCTGTTCACCGGGGTGGT GCC-
CATCCTGGTCGAGCTGGACGGCGACGTAAACGGC-
CACAAGTTCAGCGTGCGCG
GCGAGGGgaagagcACACTGCGGCTCCTCATCCACG
DNA template C (SEQ ID NO. 3):

TGCCTTGGCAGTCTCAaGATCAgctcttcGGCGAG-
GAGCTGTTCACCGGGGTGGT GCC-
CATCCTGGTCGAGCTGGACGGCGACGTAAACGGC-
CACAAGTTCAGCGTGCGCG
GCGAGGGgaagagcACACTGCGGCTCCTCATCCACG
DNA template D (SEQ ID NO. 4):
TGCCTTGGCAGTCTCAaGATCAgc-
tatcGGGGTGGTGCCCATCCTGGTCGAGCT
GGACGGCGACGTAAACGGC-
CACAAGTTCAGCGTGCGCGGCGAGGGCGAGGGC-
GAT GCCACCAAgaagagcACACTGCGGCTCCTCATC-
CACG Step 2: Tagging of the Nucleic Acid Fragments with Barcode Sequences DNAs having different barcode sequences were added to the target DNA molecules prepared in step 1 so that they could be separated individually. Specifically, primers were designed to include both sequences partially overlapping the sequences of the target DNA molecules and the barcode sequences. PCR with the primers allowed the target DNA molecules to have different barcode sequences. If necessary, barcode DNAs were attached to the barcoded target DNA molecules by ligation. The sequences partially overlapping the sequences of the target DNA molecules were as follows:

a. Forward (sense: SEQ ID NO. 5):
TGCCTTGGCAGTCTCA b. Reverse (antisense: SEQ ID NO. 6):
CGTGGATGAGGAGCCGCAGTGT Information including both some sequences of the target DNA molecules and the barcode sequences was as follows:

a. Forward (sense: SEQ ID NO. 7)
AATGATACGGCGACCACCGAGATCTACACCTTCGCCTACACTCTTTCCCT

ACACGACGCTCTTCCGATCTTGCGTCTATTTAGTGGAGCCNNNNCTATCT

TCTTTTGCCTTGGCAGTCTCAAGAT b. Reverse (antisense: SEQ ID NO. 8)
CAAGCAGAAGACGGCATACGAGATATTCAGAAGTGACTGGAGTTCAGACG

TGTGCTCTTCCGATCTCGTGGATGAGGAGCCGCAGTGT

Then, at least two DNA molecules were allowed to have one barcode sequence by DNA amplification. Thereafter, the molecular clones having the same barcodes were divided for the formation of RCA products (RCPs) and the analysis of the complete sequence. Specifically, 10 cycles of PCR amplification were performed to increase the number of the molecular clones.

Step 3: Determination of Location Coordinates of Sequence-Validated Ones of the Nucleic Acid Fragments Tagged with the Barcode Sequences DNA molecular clones of RCPs having a diameter of ≤5 µm were directly immobilized on a substrate. Specifically, steps 3-1 and 3-2 were carried out to immobilize RCA products (RCPs) on a substrate.

Step 3-1: Information on the Barcode Sequences of the Sequence-Validated DNAs by Complete Sequence Identification After amplification of the DNA samples added with the barcode sequences formed in step 2, the complete sequence was identified by NGS to select desired sequences. In this analysis, sequencing reads having the same barcodes were grouped into family reads to filter randomly generated sequencing errors of NGS so that the error rate of the analysis was reduced to a minimum level. Specifically, 300 bp paired end Illumina sequencing was performed to identify the DNA sequences, including the barcode sequences and the complete sequence. Only the same sequences were selected at a depth of ≥100× per barcode from the sequencing results of ≥90% to accurately capture desired sequences at an error rate of ≤0.001%/base.

Step 3-2: Identification of the Barcode Sequences Representing Information on the Barcode Sequences of the DNAs whose Sequences were Validated in Step 3-1 on Support The DNA molecules barcoded in step 2 were subjected to RCA reactions in a solution to form RCA products (RCPs), which were immobilized on a substrate by spraying.

A. RCA Reactions

For RCA reactions, the 5' ends of the DNA molecule (sense) strands barcoded in step 3-1 were phosphorylated by PCR with a phosphorylated primer (SEQ ID NO. 9). In the subsequent step, the (antisense) strands were biotinylated (SEQ ID NO. 10) such that only ssDNA was abundant for separation via biotin-avidin binding.

Specifically, PCR was performed to phosphorylate the 5' ends of the DNA (sense) strands and to biotinylate the 5' ends of the (antisense) strands. The designs of the primers used were as follows:

```
a. Forward (sense)
                                         SEQ ID NO. 9
5'-phos-AATGATACGGCGACCAC-3' b. Reverse (antisense)
                                         SEQ ID NO. 10
5'-biotin-CAAGCAGAAGACGGCATA-3'
```

Figure 3:
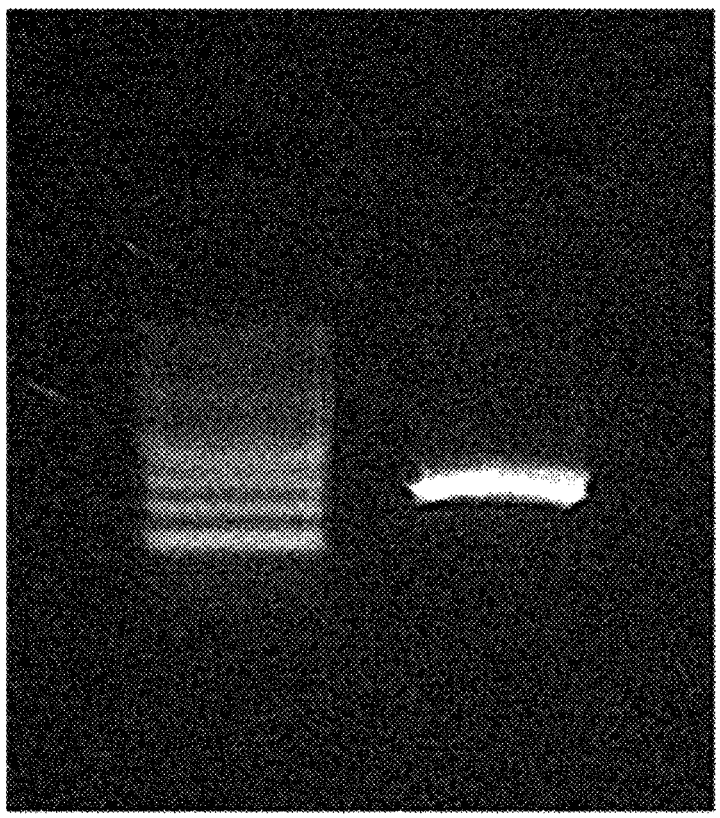
FIG. 3 shows images of DNA gels amplified after 27 cycles of PCR with primers (SEQ ID Nos. 9 and 10) designed for RCA of nucleic acid fragments tagged with barcode sequences in Example 1.

FIG. 3 shows images of DNA gels amplified after 27 cycles of PCR with the primers. As shown in FIG. 3, when compared with the DNA ladder (left), the DNA amplification products were observed at around 300 bp and the amplification products were also phosphorylated and biotinylated, presumably due to the use of the phosphorylated primer and the biotinylated primer.

Figure 4:
FIG. 4 is an image showing the formation of RCA products (RCPs) by binding with probes labeled with fluorescent molecules in Example 1.

Then, dsDNA was denatured to ssDNA such that the phosphorylated (sense) strands were abundant. Thereafter, avidin-coated magnetic beads were bound with the (antisense) strands via the biotin molecules added in the previous step and the (antisense) strands were removed by washing. The abundant ssDNA of the (sense) strands was hybridized with a padlock probe and circularized by ligation. Subsequently, RCA reactions were carried out using Phi29 polymerase. As a result, it was confirmed that RCA products (RCPs) were formed through binding with the probe labeled with fluorescent molecules (see FIG. 4).

B. Substrate Design: Design of Chip for Immobilization of the Rolling Cycle Amplification (RCA) Products and Separation by Laser It is necessary to rapidly produce hundreds of thousands of error-free DNAs per chip at low cost. To this end, approximately one million different types of DNAs need to be immobilized on one chip. In this experiment, micrometer-sized pillar structures were designed and different types of DNAs were immobilized thereon in parallel.

A laser was used for retrieval of error-free DNAs. ITO-coated glass was used to separate only desired ones of the DNAs by laser application (see FIG. 5). Specifically, one million different types of DNA clusters in the form of RCA products (RCPs) were immobilized, and then an array of pillars was designed for the purpose of laser separation. As shown in FIG. 5, a SU-8 pillar structure was constructed in a predetermined pattern on the ITO glass. Taking into consideration the size of laser regions and the formation of one RCP on each pillar, the pillar structure was designed such that the pillars had a diameter of 10 μm and a height of 5 μm and were spaced at intervals of 10 μm.

Figure 6A:
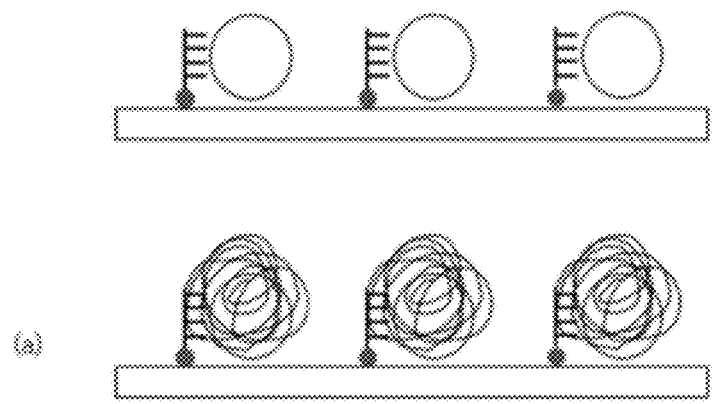
FIG. 6(a) schematically illustrates a state in which target nucleic acid molecules are captured on a substrate and clones of the target nucleic acid molecules are immobilized thereon after amplification and FIG. 6(b) a state in which clones of target nucleic acid molecules as amplification products are immobilized on a support.
Figure 6B:
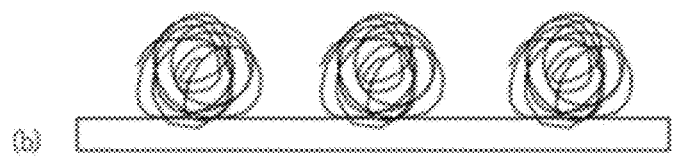

To immobilize RCA products (RCPs) on the corresponding pillars, neutravidin was coated on the pillars, biotinylated probes were loaded, synthetic genes were circularized on the probes, followed by RCA reactions (see FIG. 6a).

C. Sequencing of Barcode Regions

Figure 7:
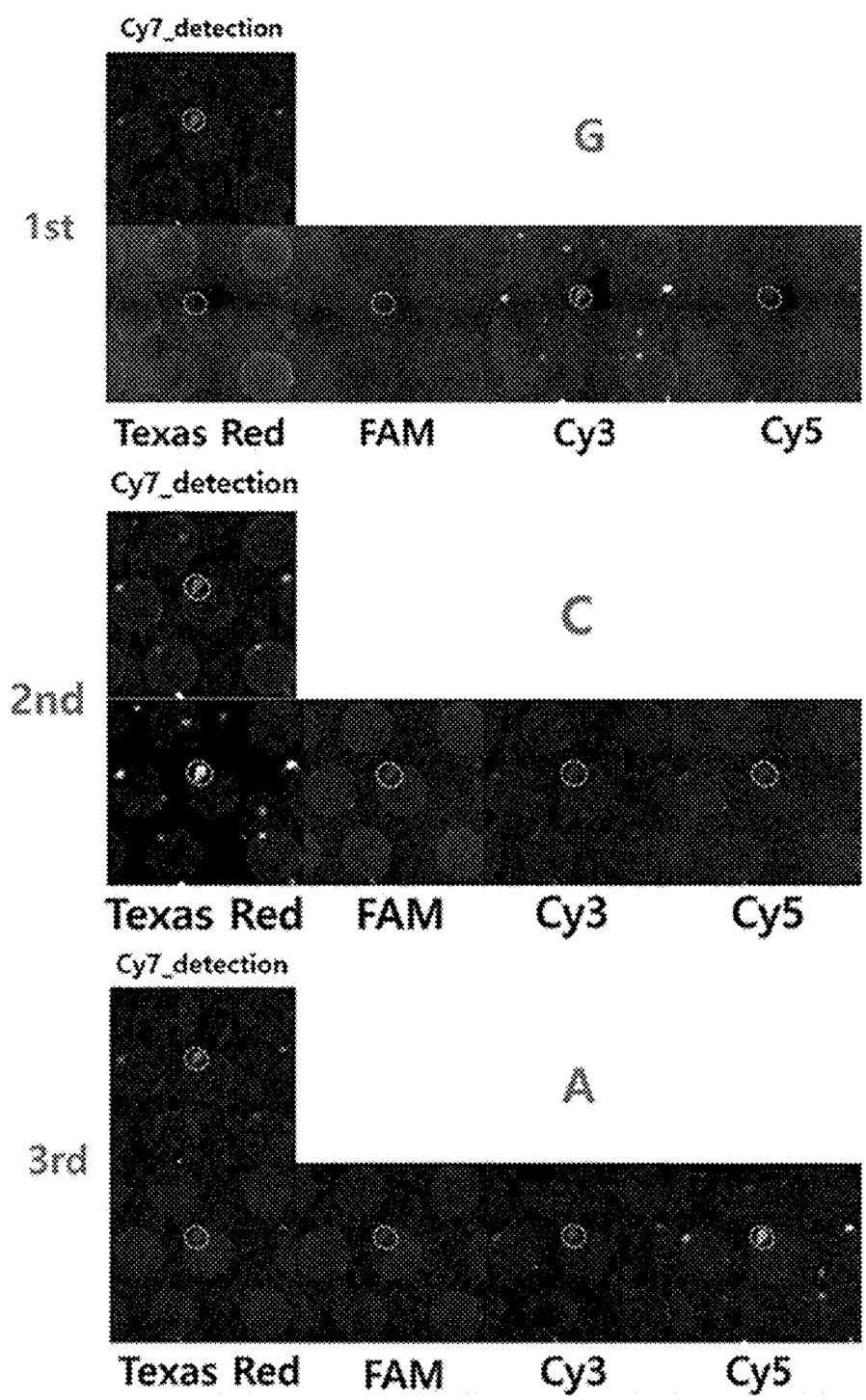
FIG. 7 shows images identifying barcode sequences of RCA products (RCPs) on a substrate in Example 1, in which Cy7 fluorescence, Cy3, Cy5, TAM, and Texas Red were used to detect the presence or absence of RCPs, guanine, adenine, thymine, and cytosine, respectively.

Barcode sequences could be read from the RCPs immobilized on the substrate by sequencing by synthesis (SBS) or sequencing by ligation (SBL). Specifically, anchor probes were attached to starting points for reading the repeat sequences of the RCPs, and sequencing probes for reading the barcode sequences were ligated with the anchor primers. The four types of sequencing probes were labeled with Cy3 (guanine), Cy5 (adenine), TAM (thymine), and Texas Red (cytosine) as fluorescent materials so that the sequences were distinguishable from one another by fluorescence microscopy. FIG. 7 shows the results of SBL sequencing for reading the barcode sequences on the substrate. As shown in FIG. 7, the barcode sequences were found to contain 'GCA'. For reference, Cy7 fluorescence, Cy3, Cy5, TAM, and Texas Red cytosine were used to detect the presence or absence of RCPs, guanine, adenine, thymine, and cytosine, respectively.

Step 4: Retrieval of the Sequence-Validated Fragments Based on Location Coordinates Location coordinates representing information on the barcode sequences of DNAs whose sequences were validated by matching in steps 3-1 and 3-2 were determined. Specifically, RCPs having barcodes matched to the sequences selected by Illumina sequencing were separated by laser and the sequences of the corresponding barcodes were identified by Sanger sequencing. In practice, RCPs were separated by laser and identified by PCR amplification (FIG. 8). For reference, #1-13, PCR product (1/10$^6$), and NTC show RCPs, positive control, and negative control, respectively.

Step 5: Identification and Validation of the Barcode Sequences by Polony Sequencing A determination was made as to whether the barcode sequences could be accurately read by polony sequencing in a state in which the RCPs were immobilized on the chip designed in FIGS. 4 and 5. The length of the readable barcode sequences was a total of 10 bases. The polony sequencing was sequencing by ligation (SBL), as shown in FIG. 9. Anchor primers were attached to the repeat sequences of the RCPs and sequencing probes for reading the barcode sequences were ligated with the anchor primers. The four types of sequencing probes were labeled with Cy3 (guanine), Cy5 (adenine), TAM (thymine), and Texas Red (cytosine) as fluorescent materials, respectively.

Figure 10:
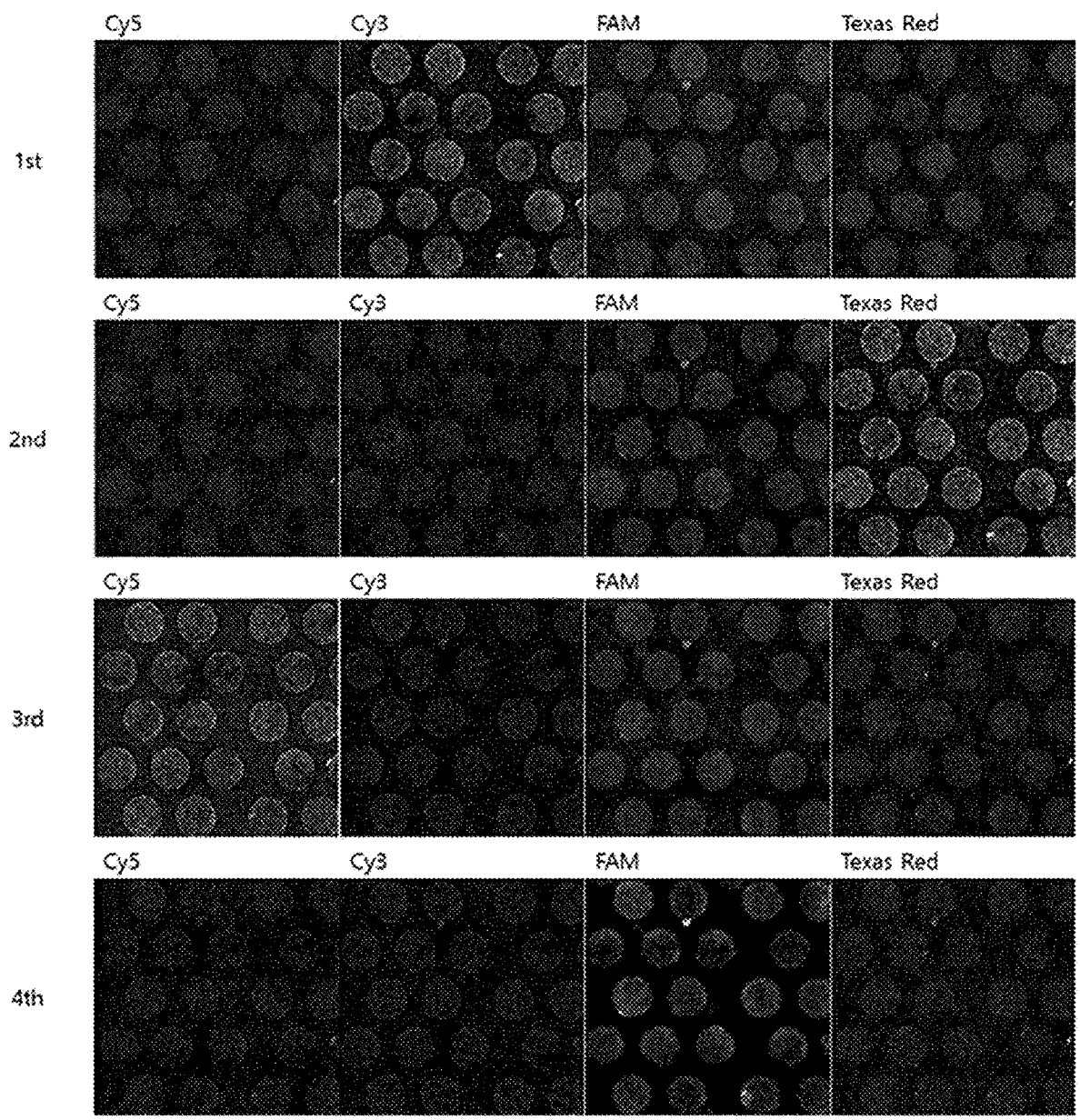
FIG. 10 photographically shows barcode sequences of a positive control read by polony sequencing in Example 1.

For a positive control experiment, first, a sample whose barcode sequences were identified by Sanger sequencing was subjected to polony sequencing. FIG. 10 shows the results of Sanger sequencing with the reverse primer. The barcode sequences were found to contain 'GCAT'.

After location coordinates representing information on the barcode sequences of the sequence-validated DNAs were determined, an appropriate pulse laser was applied for retrieval (see the rightmost of FIG. 2). The results of Sanger sequencing for the barcode sequences of the separated RCPs were completely consistent with the results shown in FIG. 12. For reference, the square boxes in FIG. 12 represent the barcode sequence regions.

Figure 11:
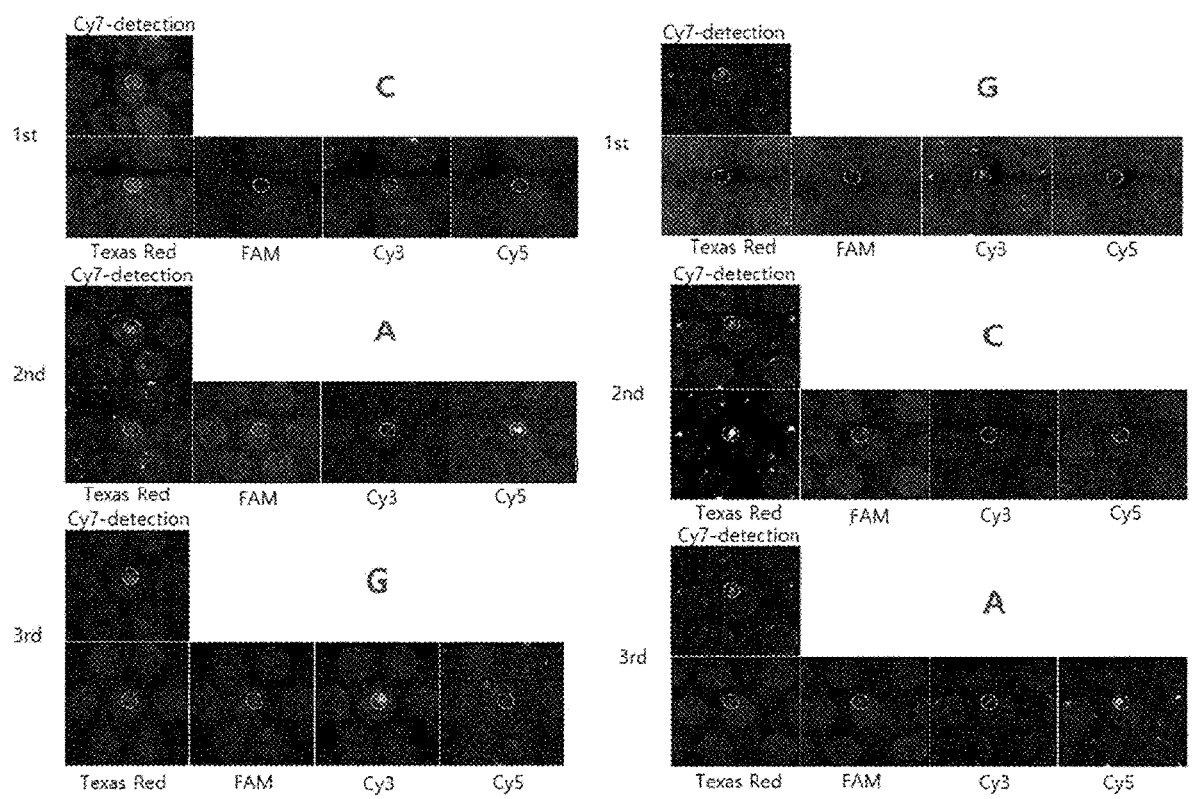
FIG. 11 photographically shows barcode sequences of an arbitrary sample read by polony sequencing in Example 1.

FIG. 10 shows the barcode sequences read by polony sequencing. As shown in FIG. 10, a large number of RCPs were attached to the surface of each pillar and the fluorescence intensity was found to increase in the order of FAM<Cy5<Texas Red<Cy3. That is, 'GCAT' was accurately read. Then, after samples having arbitrary barcode sequences were read by polony sequencing, the barcode sequences were again identified by Sanger sequencing after laser separation (see FIG. 11). The anchor primers were labeled with Cy7 as a fluorescent material to distinguish dust from the RCPs.

SU-8 pillars bound with one RCP were read by polony sequencing, as shown in FIG. 13. The RCPs were found to contain 'CAG' and 'GCA'. These pillars were separated by laser and the barcode sequences were identified by Sanger sequencing. The barcode sequences were found to contain 'CAG' and 'GCA', which were in agreement with the results read by polony sequencing (see FIG. 12).

3. Retrieval of Synthetic Error-Free DNAs and Calculation of Error Rate

Protocol for error rate calculation a) Synthetic error-free DNAs were identified by Illumina sequencing and their barcode sequences were extracted. b) RCPs formed as the synthetic DNAs were immobilized on a chip and their barcode sequences were read by in situ sequencing. c) The RCPs matched to the extracted barcode sequences were confirmed and the synthetic DNAs were retrieved by laser. d) The sequences of the retrieved DNAs were identified to determine the number of erroneous bases.

Synthetic DNAs having a pair of barcode sequences (5 bases each, 10 bases in total) were used in this experiment. The synthetic DNAs were 263 bases in length (except the barcode regions). 1,504 barcode-matched RCPs were extracted from samples validated to be error-free by Illumina sequencing. The sequences of the samples were again identified, and as a result, two of the RCPs were found to be erroneous. From these data, the error rate was calculated to be about $$0.0005\%/\text{base}\left(\frac{1}{1504}\times\frac{2}{263\text{ (base)}}\times 100(\%)\right),$$

which was below the target level (0.001%/base).

4. Information on Throughput and Treatment Time of the Error-Free Synthetic DNAs and Calculation of Production Cost Information on throughput and production cost:

The complete sequence was identified by NGS (Illumina) and about 100,000 RCPs could be formed on one chip. From these, the production cost for one desired DNA molecular clone was calculated to be about $0.05 USD.

Figure 17:
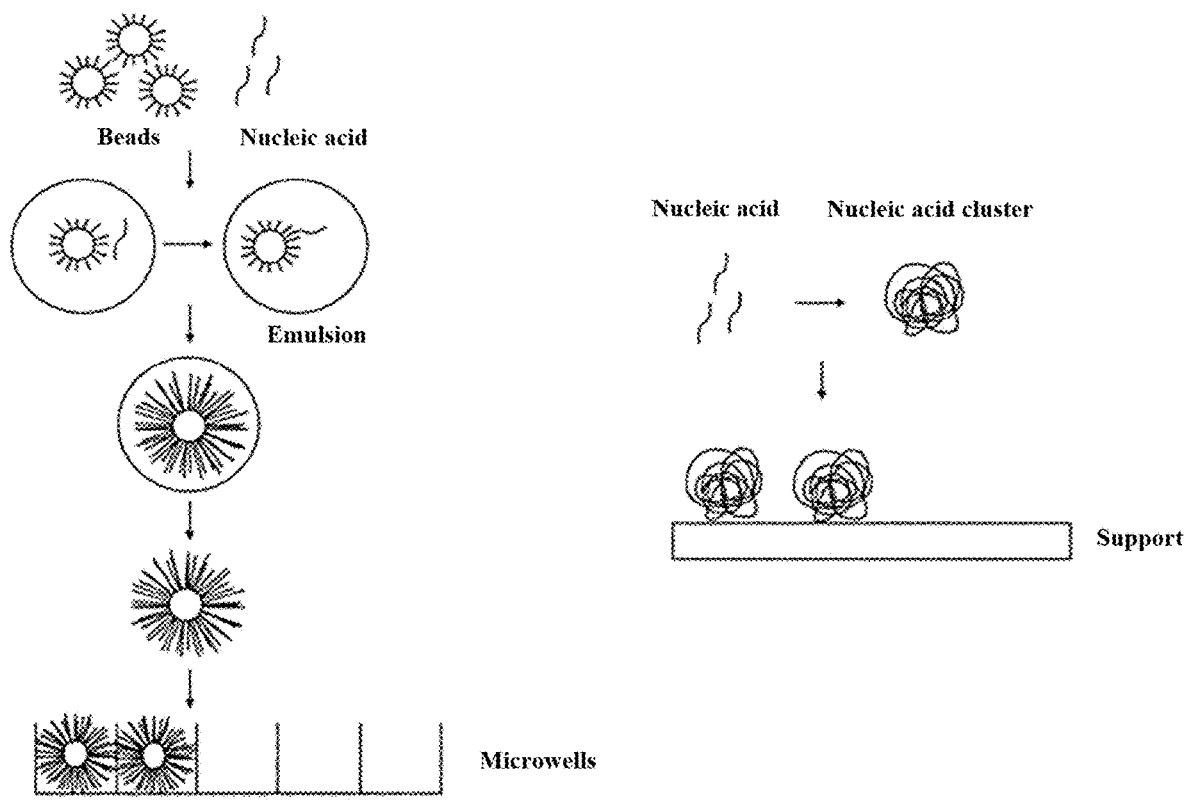
FIG. 17 is a schematic diagram showing bead-free nucleic acid microspheres in the form of negatively charged rolls according to one embodiment of the present invention that are directly immobilized on the surface of a support (right) by electrostatic attraction without being attached to beads such as bead packing (left) in Example 1.

5. Diameter of the Error-Free Synthetic DNAs and Shape of the Error-Free Synthetic DNAs Immobilized on the Support The error-free synthetic DNAs were imaged by transmission electron microscopy. The longest diameter of the corresponding 3-dimensional structure was found to be in the range of 1-300 μm, with an average of approximately 3 μm. Considering the volume (about 30 μm$^3$) of the 3-dimensional structure, the length (a total of 20 bp) of the barcode sequences used for the synthesis, and the length (50 bp-5 kbp) of the DNA template, it was found that the single DNA molecules had a length of at least 50 kbp-100 Gbp and were negatively charged in the form of rolls. Due to the roll shapes of the negatively charged long single DNA molecules, the nucleic acid molecules can be directly immobilized on the support without the need to separately immobilize the nucleic acid molecules on the support, achieving their simple immobilization. FIG. 17 schematically shows the immobilization of the nucleic acid molecules. As shown in FIG. 17, the single DNA molecules are directly immobilized on the surface of the support (right) by electrostatic attraction without being attached to beads such as bead packing (left).

Example 2

The same procedure as in Example 1 was repeated except that the following step B' was carried out instead of step B. Specifically, DNAs were immobilized on a substrate by capture and subjected to RCA reactions.

Figure 14:
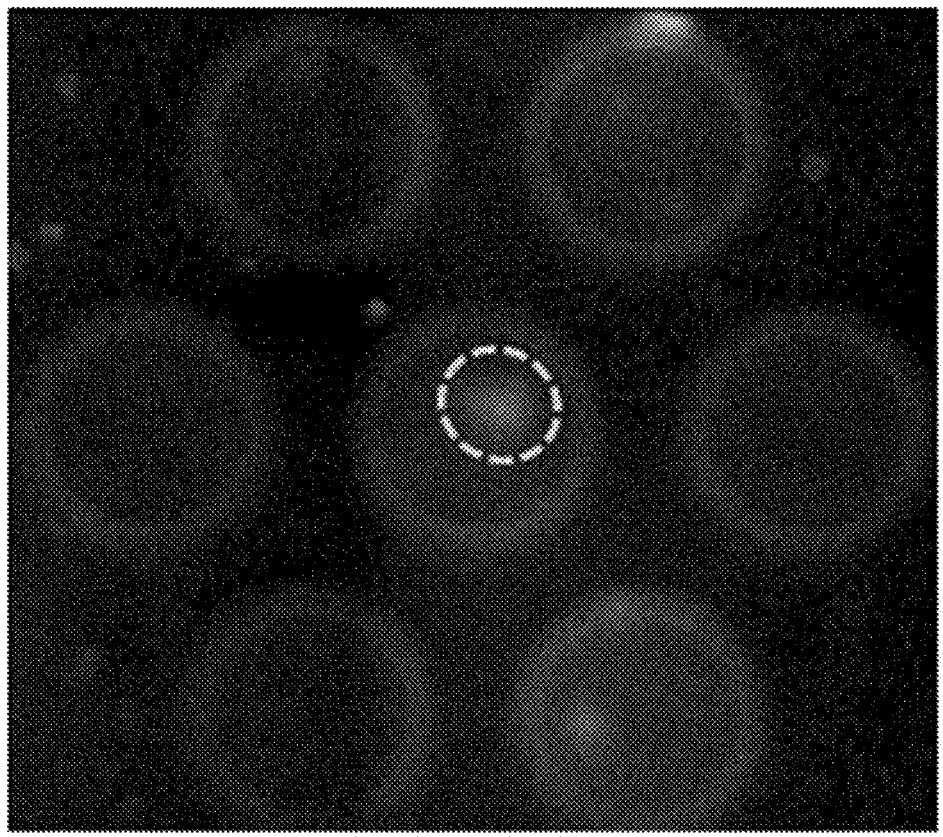
FIG. 14 is an image showing the RCA product (RCP) immobilized on the substrate based on the principle shown in FIG. 13.

Step B': Substrate Design: Design of Chip for Immobilization of Rolling Cycle Amplification (RCA) Products and Separation by Laser 3-Aminopropyltriethoxysilane (APTES) was coated on a substrate, the amine groups were exposed to the substrate surface, and the positively charged amine groups were electrostatically bound to the negatively charged DNAs. Unlike the biotin-avidin system used in Example 1, RCA was previously performed in a solution to load RCPs on the amine group-exposed chip (see FIGS. 6b and 13). The RCA products (RCPs) were immobilized on the substrate (see FIG. 14).

3. Retrieval of Synthetic Error-Free DNAs and Calculation of Error Rate

The error rate was calculated by the same method as described in Example 1. As a result, when 419 RCPs were retrieved, one erroneous base was observed in one RCP. Based on these results, the error rate was calculated to be about $$0.0009\%/\text{base}\left(\frac{1}{419}\times\frac{2}{263\text{ (base)}}\times 100(\%)\right).$$

4. Calculation of Throughput and Treatment Time of the Error-Free Synthetic DNAs In this experiment, the possibility of immobilization of 100,000 RCPs on one substrate was confirmed, ultimately leading to the retrieval of 10,000 sequence-validated RCPs.

The time taken to retrieve the 10,000 sequence-validated DNA molecules was a total of 1 week, including 2 days for chemical synthesis of the DNA molecules, 3 days for a parallel process of Illumina sequencing and in situ sequencing for acquiring information on the location coordinates of the final RCA products (RCPs) on the substrate, and 2 days for capture of the final RCA products (RCPs).

Comparative Example

Figure 15:
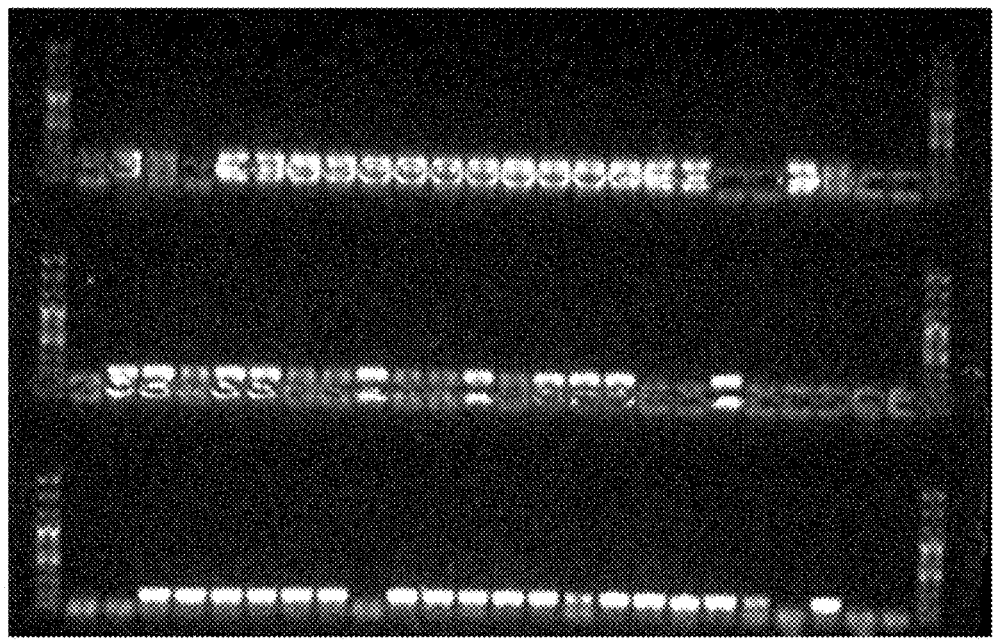
FIG. 15 photographically shows gels after recovery of DNA-capture beads, DNA amplification for sequencing, and electrophoresis.
Figure 16:
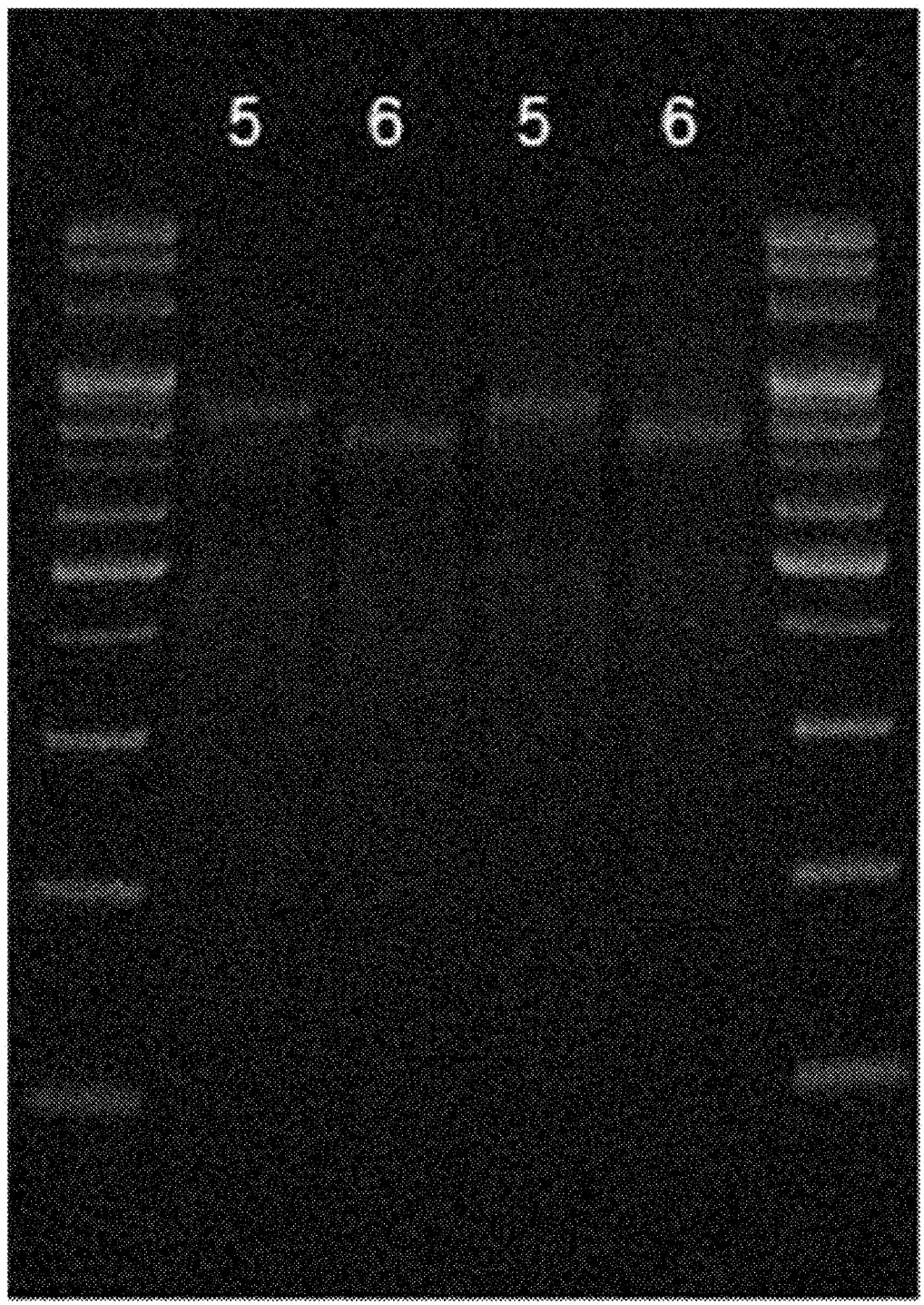
FIG. 16 photographically shows gels after a reaction with a restriction enzyme and subsequent electrophoresis when errors were observed on DNA molecules.

Experimental results for retrieval of DNAs having desired sequences using beads and emulsion PCR:

150 bp long DNAs were chemically synthesized, captured on beads having a diameter of 30 μm, and subjected to emulsion PCR. The sequences of the DNAs on the corresponding beads were identified. A total of 100 DNAs were captured on the beads. The DNA-capture beads were recovered and calculated for error rate. As a result of sequencing, errors were observed in 18 out of 25012 bases. Errors observed on the DNA molecules were indirectly confirmed by electrophoresis after a reaction with a restriction enzyme. In this case, dragging bands were observed at desired locations other than bands in the gel images, indicating that random cleavage of the DNA strands occurred (see FIGS. 15 and 16). FIG. 15 shows gels after recovery of the DNA-capture beads, DNA amplification for sequencing, and electrophoresis. FIG. 16 shows gels after a reaction with the restriction enzyme and subsequent electrophoresis when errors were observed on the DNA molecules.

7 days and $1,000 USD were required to retrieve 100 bp long DNAs having a total of 10,000 validated sequences using beads. The error rate was 0.072% per sequence.

INDUSTRIAL APPLICABILITY

As is apparent from the foregoing, the technique of the present invention is based on the use of a commercially available support and a conventional synthesis method and enables the synthesis of 500 genes at a cost corresponding to the purchase price of one gene, achieving high throughput. In addition, the technique of the present invention is effective in significantly reducing error rate. Furthermore, the technique of the present invention can reduce the number of processing steps, resulting in a about 10-fold reduction in production time and a highly efficient purification of DNA.

Due to the characteristic effects of the present technique, DNA molecular clones, whose size is 10 times or more smaller than that of a substrate, can be directly immobilized on the substrate without using beads. Therefore, a more than 10-fold larger number of DNA clone molecules can be immobilized on the substrate. This improved space efficiency leads to an increase in the number of retrievable DNAs per chip, with the result that the production cost required to retrieve one DNA can be reduced by at least 10-fold. In addition, the number of production steps can be reduced, resulting in a reduction in production time. Particularly, the use of phi29 with a low error rate during amplification as a DNA polymerase in the technique of the present invention leads to a reduction in error rate by a factor of about 70, compared to the use of beads in conventional emulsion PCR techniques.

The characteristic effects of the present technique are clearly evident when comparing the results in Examples 1 and 2 with those in Comparative Example. Indeed, it was demonstrated that the cost required to retrieve the same amount of DNA (for 7 days) was significantly reduced to $100 USD and the error rate per sequence was significantly reduced to 0.001%.

```
Sequence Listing Free Text
<110> Seoul National University R&DB Foundation

<120> Method and apparatus for obtaining high purity nucleotides

<130> SPC2018-1004

<150> KR 10/2017/0059558

<151> 2017-05-12

<160> 10

<170> KoPatentIn 3.0

<210> 1

<211> 147

<212> DNA

<213> Artificial Sequence

<220>

<223> DNA Template A

<400> 1
tgccttggca gtctcaagat cagctcttcg ttgaacgcac tcacagcgac gtctcatgag    60
caagggcgag gagctgttca ccggggtggt gcccatcctg gtcgagctgg acggcgacga   120
agagcacact gcggctcctc atccacg 147

<210> 2

<211> 147

<212> DNA

<213> Artificial Sequence

<220>

<223> DNA Template B

<400> 2
tgccttggca gtctcaagat cagctcttcg gcgaggagct gttcaccggg gtggtgccca    60
```

-continued tcctggtcga gctggacggc gacgtaaacg gccacaagtt cagcgtgcgc ggcgagggga 120
agagcacact gcggctcctc atccacg 147

<210> 3

<211> 147

<212> DNA

<213> Artificial Sequence

<220>

<223> DNA Template C

<400> 3
tgccttggca gtctcaagat cagctcttcg gcgaggagct gttcaccggg gtggtgccca 60
tcctggtcga gctggacggc gacgtaaacg gccacaagtt cagcgtgcgc ggcgagggga 120
agagcacact gcggctcctc atccacg 147

<210> 4

<211> 147

<212> DNA

<213> Artificial Sequence

<220>

<223> DNA Template D

<400> 4
tgccttggca gtctcaagat cagctcttcg gggtggtgcc catcctggtc gagctggacg 60
gcgacgtaaa cggccacaag ttcagcgtgc gcggcgaggg cgagggcgat gccaccaaga 120
agagcacact gcggctcctc atccacg 147

<210> 5

<211> 16

<212> DNA

<213> Artificial Sequence

<220>

<223> Sequence information partially overlapping the target DNA
molecule base sequence-sense <400> 5
tgccttggca gtctca 16

<210> 6

<211> 22

<212> DNA

<213> Artificial Sequence

<220>

-continued

<223> Sequence information partially overlapping the target DNA
molecule base sequence-antisense <400> 6
cgtggatgag gagccgcagt gt 22

<210> 7

<211> 125

<212> DNA

<213> Artificial Sequence

<220>

<223> Information including both a partial nucleotide sequence of a
target DNA molecule and a barcode nucleotide sequence-sense <400> 7
aatgatacgg cgaccaccga gatctacacc ttcgcctaca ctctttccct acacgacgct 60
cttccgatct tgcgtctatt tagtggagcc nnnnctatct tcttttgcct tggcagtctc 120
aagat 125

<210> 8

<211> 88

<212> DNA

<213> Artificial Sequence

<220>

<223> Information including both a partial nucleotide sequence of a
target DNA molecule and a barcode nucleotide sequence-antisense <400> 8
caagcagaag acggcatacg agatattcag aagtgactgg agttcagacg tgtgctcttc 60
cgatctcgtg gatgaggagc cgcagtgt 88

<210> 9

<211> 17

<212> DNA

<213> Artificial Sequence

<220>

<223> barcode primer-sense

<400> 9
aatgatacgg cgaccac 17

<210> 10

<211> 18

<212> DNA

<213> Artificial Sequence

<220>

<223> barcode primer-antisense

<400> 10
caagcagaag acggcata 18

SEQUENCE LISTING

<160> NUMBER OF SEQ ID NOS: 12

<210> SEQ ID NO 1
<211> LENGTH: 147
<212> TYPE: DNA
<213> ORGANISM: Artificial Sequence
<220> FEATURE:
<223> OTHER INFORMATION: Synthesized

<400> SEQUENCE: 1
tgccttggca gtctcaagat cagctcttcg ttgaacgcac tcacagcgac gtctcatgag    60
caagggcgag gagctgttca ccggggtggt gcccatcctg gtcgagctgg acggcgacga   120
agagcacact gcggctcctc atccacg                                       147

<210> SEQ ID NO 2
<211> LENGTH: 147
<212> TYPE: DNA
<213> ORGANISM: Artificial Sequence
<220> FEATURE:
<223> OTHER INFORMATION: Synthesized

<400> SEQUENCE: 2
tgccttggca gtctcaagat cagctcttcg gcgaggagct gttcaccggg gtggtgccca    60
tcctggtcga gctggacggc gacgtaaacg gccacaagtt cagcgtgcgc ggcgagggga   120
agagcacact gcggctcctc atccacg                                       147

<210> SEQ ID NO 3
<211> LENGTH: 147
<212> TYPE: DNA
<213> ORGANISM: Artificial Sequence
<220> FEATURE:
<223> OTHER INFORMATION: Synthesized

<400> SEQUENCE: 3
tgccttggca gtctcaagat cagctcttcg gcgaggagct gttcaccggg gtggtgccca    60
tcctggtcga gctggacggc gacgtaaacg gccacaagtt cagcgtgcgc ggcgagggga   120
agagcacact gcggctcctc atccacg                                       147

<210> SEQ ID NO 4
<211> LENGTH: 147
<212> TYPE: DNA
<213> ORGANISM: Artificial Sequence
<220> FEATURE:
<223> OTHER INFORMATION: Synthesized

<400> SEQUENCE: 4
tgccttggca gtctcaagat cagctcttcg gggtggtgcc catcctggtc gagctggacg    60
gcgacgtaaa cggccacaag ttcagcgtgc gcggcgaggg cgagggcgat gccaccaaga   120
agagcacact gcggctcctc atccacg                                       147

<210> SEQ ID NO 5
<211> LENGTH: 16
<212> TYPE: DNA
<213> ORGANISM: Artificial Sequence
<220> FEATURE:
<223> OTHER INFORMATION: Synthesized

<400> SEQUENCE: 5
tgccttggca gtctca                                                    16

```
<210> SEQ ID NO 6
<211> LENGTH: 22
<212> TYPE: DNA
<213> ORGANISM: Artificial Sequence
<220> FEATURE:
<223> OTHER INFORMATION: Synthesized

<400> SEQUENCE: 6
cgtggatgag gagccgcagt gt                                              22

<210> SEQ ID NO 7
<211> LENGTH: 125
<212> TYPE: DNA
<213> ORGANISM: Artificial Sequence
<220> FEATURE:
<223> OTHER INFORMATION: Synthesized
<220> FEATURE:
<221> NAME/KEY: misc_feature
<222> LOCATION: (91)..(94)
<223> OTHER INFORMATION: n is a, c, g, or t

<400> SEQUENCE: 7
aatgatacgg cgaccaccga gatctacacc ttcgcctaca ctctttccct acacgacgct      60
cttccgatct tgcgtctatt tagtggagcc nnnnctatct tcttttgcct tggcagtctc     120
aagat                                                                125

<210> SEQ ID NO 8
<211> LENGTH: 88
<212> TYPE: DNA
<213> ORGANISM: Artificial Sequence
<220> FEATURE:
<223> OTHER INFORMATION: Synthesized

<400> SEQUENCE: 8
caagcagaag acggcatacg agatattcag aagtgactgg agttcagacg tgtgctcttc      60
cgatctcgtg gatgaggagc cgcagtgt                                        88

<210> SEQ ID NO 9
<211> LENGTH: 17
<212> TYPE: DNA
<213> ORGANISM: Artificial Sequence
<220> FEATURE:
<223> OTHER INFORMATION: Synthesized

<400> SEQUENCE: 9
aatgatacgg cgaccac                                                    17

<210> SEQ ID NO 10
<211> LENGTH: 88
<212> TYPE: DNA
<213> ORGANISM: Artificial Sequence
<220> FEATURE:
<223> OTHER INFORMATION: Synthesized

<400> SEQUENCE: 10
caagcagaag acggcatacg agatattcag aagtgactgg agttcagacg tgtgctcttc      60
cgatctcgtg gatgaggagc cgcagtgt                                        88

<210> SEQ ID NO 11
<211> LENGTH: 32
<212> TYPE: DNA
<213> ORGANISM: Artificial Sequence
<220> FEATURE:
<223> OTHER INFORMATION: Synthesized
```

```
<400> SEQUENCE: 11
aaaagaagat agatgcggct ccactaaata ga                              32

<210> SEQ ID NO 12
<211> LENGTH: 32
<212> TYPE: DNA
<213> ORGANISM: Artificial Sequence
<220> FEATURE:
<223> OTHER INFORMATION: Synthesized

<400> SEQUENCE: 12
aaaagaagat agactgggct ccactaaata ga                              32
```

The invention claimed is:

1. A method for capturing high-purity nucleic acid molecules, comprising (a) preparing nucleic acid fragments, (b) tagging the nucleic acid fragments with barcode sequences, (c) determining the location coordinates of sequence-validated ones of the nucleic acid fragments tagged with the barcode sequences, and (d) retrieving the sequence-validated fragments based on the location coordinates, wherein the step (c) comprises:

step (c-1) of parallel sequencing all or some of the sequences of the fragments tagged with the barcode sequences in the step (b) to identify the barcode sequences of the sequence-validated fragments; and step (c-2) comprising: i) immobilizing the fragments tagged with the barcode sequences in the step (b) on a support and ii) identifying the barcode sequences of the tagged fragments immobilized on the support by sequencing either simultaneously or sequentially to determine the location coordinates representing the barcode sequences identified by the sequence-validated fragments in the parallel sequencing step (c-1), wherein, in step (c-2-i), the fragments tagged with the barcode sequences are directly attached to the support; the support is a patterned with repeated immobilization sites for immobilizing the fragments; each of the immobilization sites has a pillar structure and allows for the amplification of one fragment; and at least one of the immobilization sites includes only one fragment, and wherein, in the step (c-2), the fragments tagged with the barcode sequences are amplified by rolling circle amplification (RCA).

2. The method according to claim 1, wherein, in the substep i), the support surface immobilized with the fragments tagged with the barcode sequences is composed of a polymer, silica, hydrogel, glass or a combination thereof.

3. The method according to claim 1, wherein, in the substep i), the interaction with the support surface to immobilize the fragments tagged with the barcode sequences on the support is electrostatic attraction, adsorption, protein binding, self-assembly, bonding of chemical functional groups or a combination thereof.

4. The method according to claim 1, wherein, in the step (c-2), the sequencing is performed by sequencing by synthesis (SBS), sequencing by ligation (SBL), ELISA or a combination thereof to determine the location coordinates representing the corresponding barcode sequences on the support.

5. The method according to claim 1, wherein the RCA is carried out using phi29 DNA polymerase.

6. The method according to claim 1, wherein the fragments tagged with the sequences immobilized on the support are in the form of molecular clones with a diameter of 30 µm or less.

7. The method according to claim 1, wherein, in the step (c), the location coordinates are determined by labeling the barcodes with fluorescent molecules and directly observing the fluorescence.

8. The method according to claim 1, wherein, in the step (a), the nucleic acid fragments are 20 to 3,000 bp in length.

9. The method according to claim 1, wherein the parallel sequencing is selected from massively parallel sequencing, Sanger sequencing, mass spectrometry, electrophoresis, hybridization, digital PCR, allele-specific PCR, quantitative PCR, fluorescence-based classification, and combinations thereof.

10. The method according to claim 9, wherein the massively parallel sequencing is selected from the group consisting of sequencing by synthesis, Ion Torrent sequencing, pyrosequencing, sequencing by ligation, nanopore sequencing, single-molecular real-time sequencing, and combinations thereof.

11. The method according to claim 1, wherein the barcode sequences are mixtures of two or more types of randomly or intentionally designed oligonucleotides.

12. The method according to claim 1, wherein the barcode sequences are 5 to 300 bp in length.

13. The method according to claim 1, wherein the tagging with the barcode sequences is performed by a method selected from the group consisting of PCR, emulsion PCR, ligation, and combinations thereof.

14. The method according to claim 1, wherein the step (b) is carried out by selectively amplifying the target fragments with primers corresponding to the barcode sequences and retrieving the amplification products.

15. The method according to claim 14, wherein the primers are capable of binding molecules that are selectively captured, wherein the molecules are at least one of biotin, biotin dT, biotin-TEG, Dual biotin, PC-biotin, acrylic group, thiol group, dithiol group, amine group, NHS ester, azide, hexynyl, octadiynyl dU, his tag, protein tag, polyadenine (polyA), sequencing adapters for NGS, and fixed DNA sequences of 10 nt or more.

16. The method according to claim 1, wherein, in the step (d), the retrieval based on the location coordinates is performed by applying energy in either a contact or non-contact manner with the application of ultrasonic waves, a pneumatic pressure, a laser or a combination thereof.

17. The method according to claim 1, further comprising amplifying or cleaving specific sequences such that nucleic acid molecules having desired sequences are further captured from the sequence-validated fragments retrieved in the step (d).

18. The method according to claim 1, wherein, the RCA reaction of step (c) is performed in a solution to form RCA products (RCPs) and the RCPs are then immobilized on the support.

19. The method according to claim 18, wherein the RCPs are immobilized on the support by coating a multi-branched silane compound on the support.

20. The method according to claim 18, wherein the RCPs are immobilized on the support by spraying the RCPs on the support.

21. The method according to claim 1, wherein the RCA reaction of step (c) comprises a step of forming ssDNA molecules of sense strands, wherein the ssDNA molecules are hybridized with a probe and circularized by ligation.

* * * * *